(12) United States Patent
Leroux

(10) Patent No.: US 12,423,909 B2
(45) Date of Patent: Sep. 23, 2025

(54) SYSTEM AND METHOD FOR GENERATING 2D IMAGES OF VIRTUAL 3D MODELS ACCORDING TO IMAGING PARAMETERS DETERMINED FROM 2D IMAGES OF OTHER OBJECTS

(71) Applicant: Shopify Inc., Ottawa (CA)

(72) Inventor: Stephan Leroux, East Gwillimbury (CA)

(73) Assignee: Shopify Inc., Ottawa (CA)

( * ) Notice: Subject to any disclaimer, the term of this patent is extended or adjusted under 35 U.S.C. 154(b) by 114 days.

(21) Appl. No.: 17/812,001

(22) Filed: Jul. 12, 2022

(65) Prior Publication Data

US 2024/0020914 A1   Jan. 18, 2024

(51) Int. Cl.
*G06T 19/00* (2011.01)
*G06T 15/20* (2011.01)
*G06T 15/50* (2011.01)

(52) U.S. Cl.
CPC .......... *G06T 15/205* (2013.01); *G06T 15/506* (2013.01)

(58) Field of Classification Search
CPC ............... G06T 15/205; G06T 15/506
USPC ......................................................... 345/421
See application file for complete search history.

(56) References Cited

U.S. PATENT DOCUMENTS

| 2022/0301192 | A1* | 9/2022 | Boardman | G06T 7/579 |
| 2022/0343537 | A1* | 10/2022 | Taamazyan | G06V 10/147 |
| 2022/0375173 | A1* | 11/2022 | Zang | G06T 19/006 |
| 2022/0398804 | A1* | 12/2022 | Yakubenko | G06T 17/05 |

\* cited by examiner

*Primary Examiner* — Samantha (Yuehan) Wang
(74) *Attorney, Agent, or Firm* — CPST Intellectual Property Inc.; Brett J. Slaney

(57) ABSTRACT

A system and method are provided for generating 2D electronic images of virtual 3D models using imaging parameters determined from 2D images of other objects. The method includes determining, based on one or more 2D images of a first object arranged in a particular manner, a viewpoint capable of generating the one or more 2D images of the first object arranged in the particular manner. The method also includes generating a set of one or more 2D images of a second object, the generating including rendering a virtual 3D model of the second object according to the viewpoint. Related computer-readable media are also disclosed.

25 Claims, 19 Drawing Sheets

SYSTEM AND METHOD FOR GENERATING 2D IMAGES OF VIRTUAL 3D MODELS ACCORDING TO IMAGING PARAMETERS DETERMINED FROM 2D IMAGES OF OTHER OBJECTS

TECHNICAL FIELD

The following relates generally to generating 2D images of virtual 3D models using imaging parameters determined from 2D images of other objects and, in particular, to generating such 2D images by rendering the virtual 3D models according to viewpoints determined from 2D images of the other objects arranged in a particular manner.

BACKGROUND 2D images of 3D real-world objects can be generated in various manners such as, for example, by way of photography. 2D images of 3D virtual objects can also be generated in various manners such as, for example, by way of rendering.

BRIEF DESCRIPTION OF THE DRAWINGS

Embodiments will now be described with reference to the appended drawings wherein.

DETAILED DESCRIPTION

Figure 1:
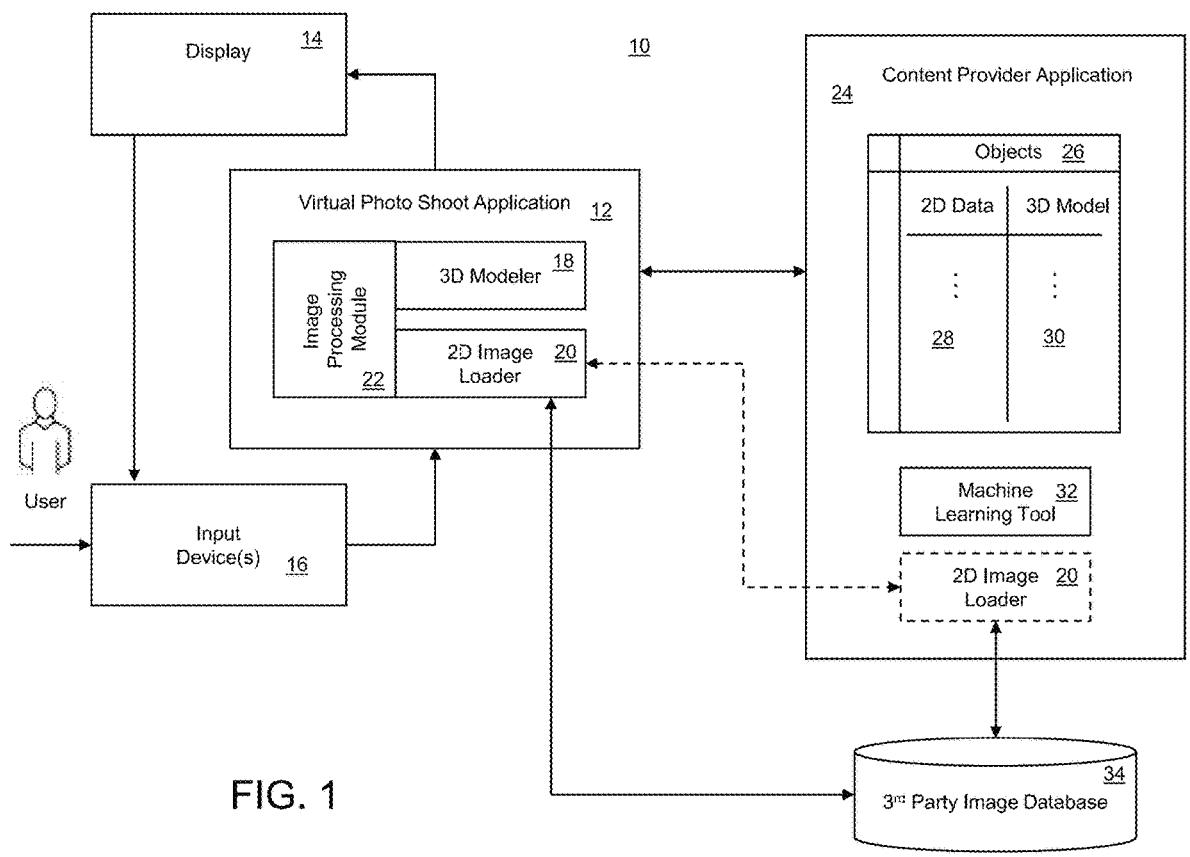
FIG. 1 is an example of a computing environment in which a component to enable a virtual photo shoot application to be used is provided.

It can be expensive and time consuming for merchants to generate product photography. For example, a merchant may need to rent out studio space and use specialized equipment in order to conduct a photo shoot of real-world products. Because of these drawbacks, using virtual models and scenery can allow merchants an alternative, and usually more cost-effective, mechanism of producing a variety of views and/or types of images of products, such as, for example, different lifestyle images of products.

However, capturing 2D images of a computer-generated 3D scene can create certain challenges. In particular, it can be difficult to know which parameters to use in capturing such 2D images, in order to mimic high quality realistic images, and to mimic real life images that buyers engage with across an e-commerce platform.

The following provides a solution to the above challenges by configuring a system to determine a set of virtual imaging parameters that can be applied to generate (e.g., render, capture, "take", etc.) a set of one or more 2D images that is consistent with a baseline set of 2D images (or arrangement that would be capable of generating such a baseline), for at least one additional product to be virtually photographed.

In one aspect, there is provided a computer-implemented method, comprising determining, based on one or more 2D images of a first object arranged in a particular manner, a viewpoint capable of generating the one or more 2D images of the first object arranged in the particular manner; and generating a set of one or more 2D images of a second object, the generating including rendering a virtual 3D model of the second object according to the viewpoint.

In another aspect, there is provided a system comprising at least one processor and at least one memory. The at least one memory includes computer executable instructions that, when executed by the at least one processor, cause the system to determine, based on one or more 2D images of a first object arranged in a particular manner, a viewpoint capable of generating the one or more 2D images of the first object arranged in the particular manner; and generate a set of one or more 2D images of a second object, the generating including rendering a virtual 3D model of the second object according to the viewpoint.

In another aspect, there is provided a computer readable medium comprising computer executable instructions that when executed by a processor, cause the processor to execute instructions comprising: determining, based on one or more 2D images of a first object arranged in a particular manner, a viewpoint capable of generating the one or more 2D images of the first object arranged in the particular manner; and generating a set of one or more 2D images of a second object, the generating including rendering a virtual 3D model of the second object according to the viewpoint.

In certain example embodiments, the viewpoint can include at least one orientation of the virtual 3D model. The method can include determining a plurality of views, each view corresponding to a respective viewpoint of the virtual 3D model.

In certain example embodiments, the viewpoint can include a zoom level.

In certain example embodiments, the viewpoint can include an image depth.

In certain example embodiments, the method can include obtaining the set of one or more 2D images of the first object and processing the set of one or more 2D images to determine the viewpoint.

In certain example embodiments, the method can include obtaining a virtual 3D model of the first object capable of generating the one or more 2D images of the first object arranged in the particular manner; and determining the viewpoint from the virtual 3D model of the first object. The virtual 3D model of the first object can be successively manipulated to approximate what is shown in the one or more 2D images of the first object, and compared to the one or more 2D images of the first object until a similarity criterion has been met.

In certain example embodiments, the viewpoint can be determined from a collection of 2D images of objects similar to the first object.

In certain example embodiments, the method can include determining one or more lighting parameters; and applying the one or more lighting parameters to a virtual scene comprising the virtual 3D model.

In certain example embodiments, the method can include applying the method to a plurality of first objects and to a plurality of second objects; and generating a composite virtual scene comprising the plurality of second objects prior to capturing the set of 2D images of the plurality of second objects. Generating the composite virtual scene can include applying at least one offset factor to arrange the plurality of second objects relative to each other.

In certain example embodiments, the method can include rendering a virtual 3D model of at least one additional object; and capturing a set of one or more 2D images of the virtual 3D model of the at least one additional object arranged according to the viewpoint.

In certain example embodiments, the method can include providing an option for a virtual photoshoot of the second object; and receiving an input providing the set of one or more 2D images of the first object or requesting the set of one or more 2D images to be automatically determined.

In certain example embodiments, the set of one or more 2D images of the first object may correspond to one or more real-world images taken of the first object.

In certain example embodiments, the first object and the second object are the same product, and wherein the set of one or more 2D images of the first object corresponds to one or more real-world images taken of the product.

Generating 2D Electronic Images of Virtual 3D Models Using Imaging Parameters Determined from 2D Images of Other Objects The disclosed system can be applied to generate (e.g., render, capture, take, etc.) a set of one or more 2D images that is consistent with a baseline set of 2D images (or arrangement that would be capable of generating such a baseline), for at least one additional product to be virtually photographed. The baseline set of 2D images can be based on a set of real-world photographs or virtual 2D images of a baseline object (e.g., a product for which the merchant has already held a professional real-world photoshoot or created a desired set of virtual 2D images) or can be determined from a set or collection of real-world product photography of the same or similar objects, according to certain criteria (e.g., by training a machine learning model on real-world product photography that is considered popular, reputable/professional or otherwise desirable).

The set of virtual imaging parameters, once determined, can be applied to a virtual 3D model of the additional product(s) to achieve the desired consistency with the baseline arrangement of the object, namely the viewpoint of the object positioned in a particular manner. If applicable, the virtual imaging parameters may include parameters to be applied to the background and/or other objects to be staged within a scene showcasing the product. This can include applying styling factors and/or branding elements relevant to the product(s) and/or merchant. That is, in addition to the positioning of a virtual camera within the 3D coordinate space, other parameters that can be important in replicating or mimicking high quality real life images may include lighting conditions such as ambient light color, brightness, depth information, perspective, shadows, etc.; as well as what other objects, if any, should surround the product of interest in the scene. For example, certain products like furniture may appear more realistic within a virtual room or arrangement whereas other products like footwear or handbags may routinely be shown on their own without other products in the scene.

The disclosed system can therefore be utilized by a merchant or other user having a virtual 3D model of a product for which they wish to generate a desirable/consistent set of 2D images for that product. The system can be implemented as a separate standalone tool or service to generate the 2D images that are then uploaded to a particular site (e.g., an e-commerce site), or can be an embedded tool or functionality built into a larger system such as the site itself.

The system is configured to apply an appropriate methodology to "back out" or otherwise detect, read, reverse engineer, calculate, compute or determine the imaging parameters from a set of one or more photos or 2D electronic images (in general, hereinafter referred to as a set of one or more 2D images) of the baseline product that will be applied to the virtual 3D model of the second product to which the virtual "photo shoot" is applied. The input set of 2D images can originate from multiple different sources or processes and the imaging parameters can be determined from the input set of 2D images (or related data) using an appropriate technique that is dependent on the nature of the input set of 2D images and any data associated with those images.

The input set of 2D images (that is, the set of 2D images to which the system applies the methodology to back out the imaging parameters), can directly include, note, reveal or otherwise provide the imaging parameters, or may require additional processing to do so. The input set of 2D images may also be either known in advance or determined at the time of utilizing the system. For example, the system can be utilized in a number of scenarios.

In one scenario, there exists a set of real-world images (e.g., photographs) of a product and the corresponding imaging parameters are determined from those images. Whether a 3D model already exists for the baseline object/product, or is generated at that time, some form of image processing can be applied to translate features from the real-world 2D images to parameters that can be applied to the virtual 3D model of that product, and then can be replicated in the next product. If a virtual 3D model is not available, instead of generating in real-time, an alternative implementation can include applying processing to understand the orientation of the object within the photo (e.g., using depth information and labeling) so that the virtual object (that is not the object in the photo) can be oriented in the same way.

In another scenario, the merchant or user does not have any images to begin with for the product requiring the virtual photoshoot, but the system has access to a set or collection of real-world photography that has been used (or can be used at that time) to determine a set of proposed desirable imaging parameters to be applied to the virtual 3D model of that product. For example, the system can rely on existing images that are known to have a desirable look and feel which can be leveraged to determine the imaging parameters to apply to the virtual photo shoot.

In another scenario there exists a desirable set of 2D images that was previously obtained from an existing 3D model of an object/product. This can be from the merchant or user utilizing the system or based on the work of another user or entity. The imaging parameters for the virtual 3D model of this baseline product may thus already be known and can be extracted and used in the next step. That is, the imaging parameters may exist while the desirable set of 2D images does not necessarily exist, but the imaging parameters are capable of generating such 2D images of the baseline object arranged in a particular manner.

In another scenario, there exists a 3D model of a baseline product and a set of 2D images are generated in a preliminary phase to generate a set of imaging parameters. For example, a merchant may undertake an initial virtual photoshoot which can be done manually, using an automated tool, or be outsourced. The imaging parameters can then be extracted from the resultant virtual 3D model that was used to obtain the desirable set of 2D images and used in the next step.

Variations of these example scenarios are also possible. For example, the system may have knowledge of, or access to, a collection of imaging parameter sets that have been used for other products across a platform (with multiple users) and a proposed set of imaging parameters is determined from the collection based on certain criteria such as a product sub-type (e.g., men's vs. women's vs. children's). That is, a catalogue of imaging parameter sets can be stored, and the catalogue updated over time, as more and more virtual photoshoots are executed.

Turning now to the figures, FIG. 1 illustrates an example of a computing environment 10 in which virtual photo shoots of 3D objects can be implemented, using imaging parameters determined from 2D images of other objects. The computing environment 10 shown in FIG. 1 can represent a single device such as a portable electronic device or the integration/cooperation of multiple electronic devices such as a client device and server device or a client device and a remote or offsite storage or processing entity or service. That is, the computing environment 10 can be implemented using any one or more electronic devices including standalone devices and those connected to offsite storage and processing (e.g., via cloud-based computing storage and processing facilities). For example, a user interface may be provided by an electronic device while data used to load, view, and manipulate the 2D images and virtual 3D models of objects as described herein can, at least in part, be stored and accessed from an external memory or application, including a cloud-based service or application.

Such electronic devices can include, but are not limited to, a mobile phone, a personal computer, a laptop computer, a tablet computer, a notebook computer, a hand-held computer, a personal digital assistant, a portable navigation device, a wearable device, a gaming device, an embedded device, a smart phone, a virtual reality device, an augmented reality device, etc.

The computing environment 10 includes a virtual photo shoot application 12 that is coupled to a display 14 to render and present/display user interface (UI) elements utilized in the application 12, on the display 14. While examples referred to herein may refer to a single display 14 for ease of illustration, the principles discussed herein can also be applied to multiple displays 14, e.g., to compare multiple objects or view multiple UIs at the same time on side-by-side screens. That is, any reference to a display 14 can include any one or more displays 14 or screens providing similar visual functions. The virtual photo shoot application 12 receives one or more inputs from one or more input devices 16, which can include or incorporate inputs made via the display 14 as illustrated in FIG. 1 as well as any other available input to the computing environment 10, such as haptic or touch gestures, voice commands, eye tracking, biometrics, keyboard or button presses, etc. Such inputs may be applied by a user interacting with the computing environment 10, e.g., by operating an electronic device having the display 14 and at least an interface to one or more input devices 16.

The virtual photo shoot application 12 also includes a 3D modeler 18 for generating and manipulating virtual 3D models, a 2D image loader 20 for generating, accessing, loading and manipulating 2D images; and an image processing module 22; which are shown as separate elements in FIG. 1 for ease of illustration. That is, the 3D modeler, the 2D image loader 20, and/or the image processing module 22 can be implemented as separate components coupled to the virtual photo shoot application 12 or be integrated/embedded in the virtual photo shoot application 12. As such, the configuration shown in FIG. 1 is for illustrative purposes and can be reconfigured to suit different computing environments 10. For example, the 3D modeler 18 or 2D image loader 20 could be provided by a separate entity such as a server application connected to the virtual photo shoot application 12 (as shown for the 2D image loader 20 in dashed lines) over a communication network (not shown). Such communication network(s) may include a telephone network, cellular, and/or data communication network to connect different types of client- and/or server-type devices. For example, the communication network may include a private or public switched telephone network (PSTN), mobile network (e.g., code division multiple access (CDMA) network, global system for mobile communications (GSM) network, and/or any 3G, 4G, or 5G wireless carrier network, etc.), WiFi or other similar wireless network, and a private and/or public wide area network (e.g., the Internet).

The computing environment 10 also includes a content provider application 24, which can be a standalone application or feature embedded in or accessed by another application or service. The content provider application 24 represents an application that has been programmed, configured, and can be instructed or requested to provide content to the virtual photo shoot application 12 as illustrated in FIG. 1, in order to display such content on the display 14 and to interact with same, e.g., via the input device(s) 16. As described herein, such content can include stored objects 26 that are processed as described herein to implement a virtual photo shoot of an object 26 based on 2D images of one or more other objects 26, i.e., to apply imaging parameters to a virtual 3D model 30 of the object 26 according to a baseline set of 2D images. In this example, the objects 26 can be stored in a database or other storage element such as a memory as entries, elements, or files that can include 2D data 28 (e.g., images/photos) and, for at least some objects 26, 3D models 30 of the object 26. The objects 26 can therefore have 2D data 28 providing 2D content to the virtual photo shoot application 12 to be displayed on the display 14 as well as associated 3D content such as 3D models 30 corresponding to 2D images of the same object 26.

The content provider application 24 can be a module or feature embedded in or accessible to any application that provides 2D and/or 3D content as an output, in response to a request, query, trigger, threshold or other input. For example, the content provider application 24 can facilitate creating product pages and generating virtual photos for products to be displayed on those pages, as well as responding to search queries or detecting navigation into a catalogue or other list of objects 26 to be displayed to a user within the computing environment 10. As noted above, the computing environment 10 can represent a single electronic device or multiple electronic devices in a client-server relationship such that the content provider application 24 can be either an application running on the same electronic device as the display 14, input device(s) 16 and virtual photo shoot application 12, or be a remote service that receives and responds to data retrieval calls from the virtual photo shoot application 12, e.g., in providing a virtual photo shoot option in a UI being displayed on the display 14.

As shown in FIG. 1, the content provider application 24 can include images of the objects 26 stored as part of the associated 2D data 28 or can access such images from elsewhere, for example, a third party image database 34. The third party image database 34 in this example represents any outside source of 2D images, such as a library of images stored and/or accessed by the computing environment 10 or other public or subscription-based repositories of images that are available to the computing environment 10. As described herein, the virtual photo shoot application 12 is operable to enable 2D images to be generated for a 3D model 30 of an object 26 according to imaging parameters determined based on 2D images of other objects. Such 2D images of other objects may be provided or otherwise available to the content provider application 24 or virtual photo shoot application 12 directly or may need to be located and obtained in order to determine suitable imaging parameters that, for example, mimic a viewpoint used in images of the same or similar object. In FIG. 1, the 2D image loader 20 can access the third party image database 34 directly or via a 2D image loader 20 that operates on/with the content provider application 24. That is, the 2D image loader 20 can operate on either or both the virtual photo shoot application 12 and the content provider application 24 and may represent any function or interface that is capable of connecting to and receiving or otherwise obtaining or acquiring 2D images of objects 26. Such 2D images can be stored as 2D data 28 associated with an object 26 (e.g., a product listing) or may be stored or accessed using some other storage or access mechanism.

In the example configuration shown in FIG. 1, the content provider application 24 also includes a machine learning tool 32. The machine learning tool 32 can be used to train machine learning models associated with products or product types to allow users to find imaging parameters that are deemed desirable for those products, product types, or other characteristics. For example, collections of 2D images selected by users or located automatically by the content provider application 24 can be fed to the machine learning tool 32 to train one or more machine learning models that permit the virtual photo shoot application 12 to determine the set of imaging parameters used to render a virtual 3D model. The rendered virtual 3D model enables a set of 2D images to be generated of that virtual 3D model, which in this case is based on images used to train the model rather than a set of photos input by the user. In other words, the machine learning tool 32 can be used to generate imaging parameter sets that can be used when an input set of 2D images is not available but the user still wants to leverage the imaging parameters used in a desirable baseline set of images. The imaging parameters modeled in this way can be based on product type or other characteristics such as gender, style, category, theme, etc. The machine learning tool 32 can therefore be leveraged by the virtual photo shoot application 12 and the content provider application 24 (using the virtual photo shoot application 12) to determine desirable imaging parameters when a set of 2D images of a baseline object is not directly available to the user.

The machine learning tool 32 can be used to train machine learning models by generating classifiers that can be used to predict an appropriate set of imaging parameters given an input related to the object. For example, a user that has a virtual 3D model for which a virtual photo shoot is to be applied can have an image of the virtual 3D model, the model itself, or other data such as product type or category input to the machine learning tool 32 to run that data against a set of classifiers that have been generated and can be used to understand how the input variables relate to the associated classes. The classifiers can be trained using the machine learning tool 32 (or another machine learning system) by labeling a dataset of images to enable the input images or other input data to be used to find the most appropriate model. The model can be built and trained in this way and used to identify a desired set of imaging parameters associated with the model, that are based on the images used to train the dataset. That is, specific datasets can be used to train models that identify desirable imaging parameters based on a class, the class being associated with a product, product type, or other characteristic used to classify an input to the machine learning model 32 to in turn identify the appropriate imaging parameters.

Figure 2:
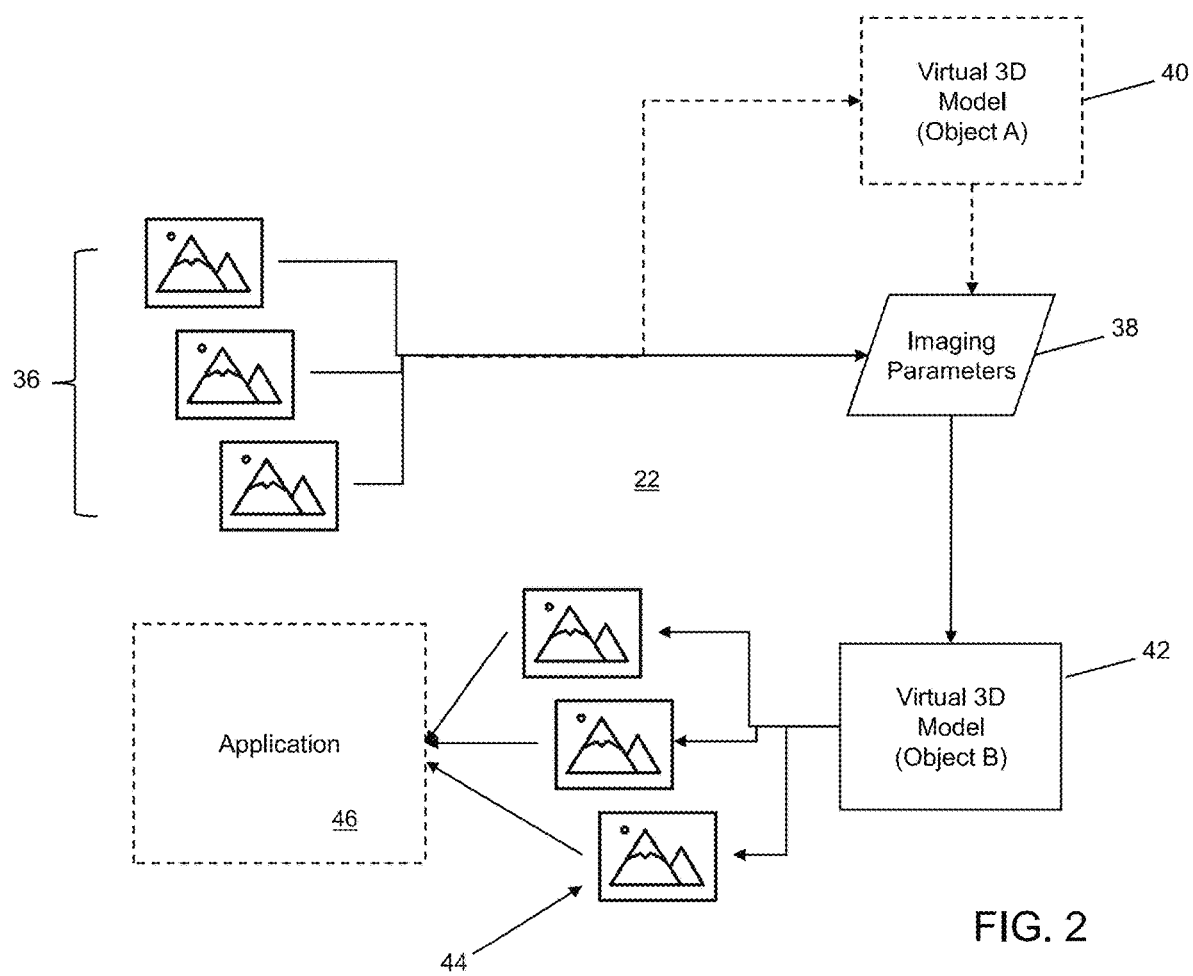
FIG. 2 shows a workflow for generating 2D images of virtual 3D models using imaging parameters determined from 2D images of other objects.

FIG. 2 illustrates a workflow that can be implemented in using a set of 2D images of a first object arranged in a particular manner, to generate a set of 2D images of a second object by rendering a virtual 3D model of the second object according to imaging parameters capable of generating the 2D images of the first object. A set of 2D images 36 can be loaded or otherwise obtained by the 2D image loader 20 and is used by the image processing module 22 to determine a set of imaging parameters 38, for example, viewpoints of the objects in the set of 2D images 36, that are capable of generating the particular input 2D images 36. It can be appreciated that while this example utilizes a set having multiple 2D images 36, a single 2D image 36 can also be used to determine the desired imaging parameters 38. As shown in dashed lines in FIG. 2, a virtual 3D model 40 of the first object (Object A) may also be generated by the imaging processing module 22 using the 3D modeler 18, to generate the imaging parameters 38. For example, the set of 2D images 36 may have a corresponding virtual 3D model 40 available to the image processing module 22 via the 3D modeler 18, which enables parameters such as camera angles, depth of focus, zoom level, and lighting parameters to be determined directly from attributes or settings determinable from the virtual 3D model 40. Similarly, the image processing module 22 can use the set of 2D images 36 to generate a virtual 3D model 40 of the first object 26 that can be used by the 3D modeler 18 to find or approximate the imaging parameters 38 that would achieve the desired look and feel seen from the set of 2D images 36.

As such, once the nature of the input set of 2D images 36 is determined, the image processing module 22 is used by the virtual photo shoot application 12 to select and apply the appropriate technique to determine the corresponding imaging parameters 38. The corresponding imaging parameters 38 effectively indicate how a virtual 3D model 40 of the object 26 (e.g., product) in the input set of 2D images 36 would need to be posed or how the virtual scene would need to be modified, and any other aspects of the surrounding scene set up, to replicate the input set of 2D images 36 for another object 26. In other words, the imaging parameters 38 effectively reverse engineer how the baseline or input set of 2D images 36 has or could have been generated to achieve their desirable look and feel projected by the input set of 2D images. Such information can be input to the 3D modeler 18 to arrange a virtual 3D model 42 of the object being imaged (Object B) in the virtual photo shoot.

Determining the imaging parameters 38 can include reading the appropriate values from the virtual 3D model 40 of Object A that already exists and was used in generating the input set of 2D images 36 for the baseline product (or could have been used to do so). This may have been done previously or applied in real-time as a preliminary process. On the other hand, the 3D model 40 for the baseline product may not exist and may need to be generated and manipulated in successive approximations until a criterion such as similarity threshold is met as described in greater detail below. For example, coordinate systems can be aligned and camera angles, image depth, zoom levels, and other features automatically determined. Successive approximation techniques can be applied by manipulating the virtual 3D model 40 and comparing what is seen to the input set of 2D images 36 until a suitable match is found or a threshold achieved. Similarly, as discussed above, where a matching 3D model does not exist, an alternative approach can apply processing to determine estimations on the object in the sample image set for camera position, object orientation, which can then be used on the other virtual object. It can be appreciated that this technique may be particularly advantageous when the sample image set is of the same real object. If available, other techniques can be applied by the image processing module 22 directly to the input set of 2D images 36 without requiring the virtual 3D model 40 (and thus shown in dashed lines in FIG. 2). For example, machine learning models trained over similar objects can be applied to the input set of 2D images 36 to find approximate imaging parameters 38 such as view angle, depth, and lighting parameters. The image processing module 22 can therefore include or have access to the machine learning tool 32 or a set of models trained as indicated above.

As also discussed above, the input set of 2D images 36 may not necessarily be provided as a direct input, but is determined, e.g., from the third party image database 34. That is, the imaging parameters 38 can be determined from a desirable set of 2D images 36 generated, for example, in real-world professional photo shoots or other virtual photo-shoots. In this case, the image processing module 22 can determine the product or type of the object 26, based on a manual user input via the 2D image loader 20, through an automatic object detection in a sample image, or from the virtual 3D model 42 that is to be used for the virtual photo shoot. Once the image processing module 22 knows what type of product is being subjected to the virtual photo shoot, existing models (or parameter sets) for similar products can be accessed. As noted above, such models or imaging parameter sets can also be generated using machine learning techniques applied to real-world photography to train a model for that product type. These product models can be refined and updated and re-used for other users (e.g., other merchants on an e-commerce site).

Continuing with FIG. 2, the virtual 3D model 42 of the second object (Object B), namely the object for which the virtual photo shoot is to be conducted, may then be rendered according to the imaging parameters 38, e.g., using the 3D modeler 18. This allows a set of one or more 2D images 44 of the second object to be generated in a way that mimics, follows, or otherwise achieves a desired look and feel as the input set of 2D images 36. For example, the virtual 3D model 42 for Object B can be arranged in a particular manner in the scene, both based on its viewpoint (e.g., view angle, zoom, etc.) and the attributes of the scene in which it is being imaged (e.g., type of lighting (spot lighting, directional lighting, ambient lighting, etc.), depth, camera positioning). For example, the viewpoint can be moved relative to the scene to capture the object in a particular manner. The set of 2D images 44 for Object B can then be generated with the virtual 3D model 42 for Object B rendered according to the imaging parameters 38. As with the input set of 2D images 36, it can be appreciated that while this example generates a set having multiple 2D images 44, a single 2D image 44 can also be generated. The set of 2D images 44 that are output by the image processing module 22 provide the output of the virtual photo shoot. Optionally, as shown in dashed lines in FIG. 2, the output set of 2D images 44 can be utilized in or provided to an application 46 by the 2D image loader 20, for example, to add a set of views of a product in a product details page for an e-commerce site.

Figure 3:
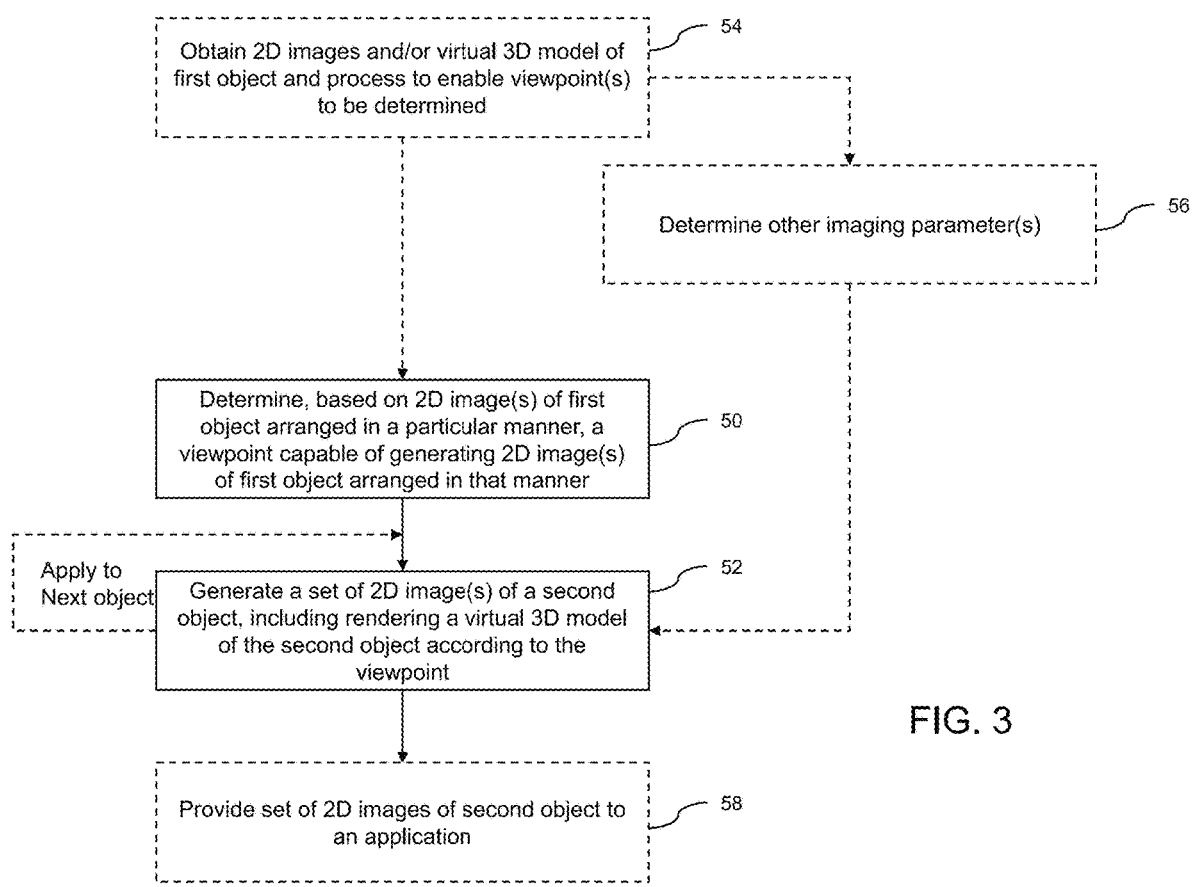
FIG. 3 is a flow chart illustrating an example set of computer executable instructions that can be executed for generating a set of 2D images of a second object, including rendering a virtual 3D model of the second object according to a viewpoint determined based on 2D images of a first object arranged in a particular manner.

Referring now to FIG. 3, a flow chart is provided illustrating example computer executable instructions that can be implemented in generating an output set of 2D images 44 as illustrated in FIG. 2. The operations shown in FIG. 3 may be implemented by an electronic device in the computing environment 10 by utilizing the virtual photo shoot application 12 and its image processing module 22, 3D modeler 18, and 2D image loader 20. At block 50, the image processing module 22 determines, based on the input set of one or more 2D images 36 of a first object (e.g., Object A), arranged in a particular manner, a set of imaging parameters 38 capable of generating the 2D images of the first object arranged in the particular manner. For example, the set of imaging parameters can define the viewpoint that would be capable of generating the 2D images of the first object arranged in the particular manner. That is, the imaging parameters 38 can define a viewpoint, which can include, for example, view angle, depth, and zoom.

At block 52, the image processing module 22 generates a set of 2D images 44 of a second object (e.g., Object B), by rendering a virtual 3D model 40 of the second object according to the viewpoint determined in block 50. In this way, the input set of 2D images 36 can be used as a baseline to obtain a virtual photo shoot of the second object in a way that achieves what is desirable about what is in the input set of 2D images 36. This baseline can then be used repeatedly as shown in dashed lines in FIG. 3, by repeating block 52 for a virtual 3D model of a next object. This can be repeated across a product line, can be used to apply consistency for multiple product lines posted to an e-commerce site, etc.

In addition to determining the viewpoint and generating the set of 2D images of the second object in blocks 50, 52, certain optional operations can also be performed. For example, at block 54, the input set of 2D images 36 and/or the virtual 3D model 40 of the first object can be obtained by the virtual photo shoot application 12 and processed to enable the viewpoint or multiple viewpoints to be determined at block 50. For example, this can include receiving a set of real-world photographs or digital images via the 2D image loader 20 and generating a virtual 3D model 40 of the first object using the 3D modeler 18, based on an image processing technique applied to the photographs or digital images. The 2D images 36 can be provided by the user or can be requested by selecting an option to utilize desirable images of other products. Examples of the operations that can be performed in block 54 are exemplified in FIGS. 4-6, discussed below.

Additionally, if other imaging parameters 38 are to be used in generating the output set of 2D images 44, these imaging parameters can be determined at block 56. The other imaging parameters 38, such as lighting, can be determined by processing the input set of 2D images 36 and/or the virtual 3D model 40 of the first object at block 56. The other imaging parameters 38 can include ambient lighting in the scene, or lighting applied to the virtual scene such as spot lighting and directional lighting. Lighting parameters can be determined using a lighting template determined from one or instances of pre-existing digital media depicting similar objects or multiple associated objects, for example, as detailed in co-pending U.S. patent application Ser. No. 17/237,372 filed on Apr. 22, 2021 and entitled "Systems and Methods for Modifying Lighting in Three-Dimensional Models", the contents of which are incorporated herein by reference. The imaging parameters 38 may also include colors associated with a brand or a certain style and may affect the lighting parameters, e.g., by having ambient light reflect a color associated with the brand or style.

The other imaging parameters 38 may also be determined separately or provided by way of a separate set of inputs used in block 52 to generate the set of 2D images 44, i.e., in addition to rendering the virtual 3D model 42 of the second object to obtain the desired viewpoint. Another optional operation can include providing the set of 2D images 44 of the second object to an application 46 at block 58, e.g., as illustrated in the process flow shown in FIG. 2. That is, blocks 50 and 52 (and optionally 54 and 56) can be executed by initiating the virtual photo shoot application 12 within another application or workflow to obtain the set of 2D images 44 of the second object for a desired purpose, such as generating images of a product for an e-commerce product page.

Figure 4:
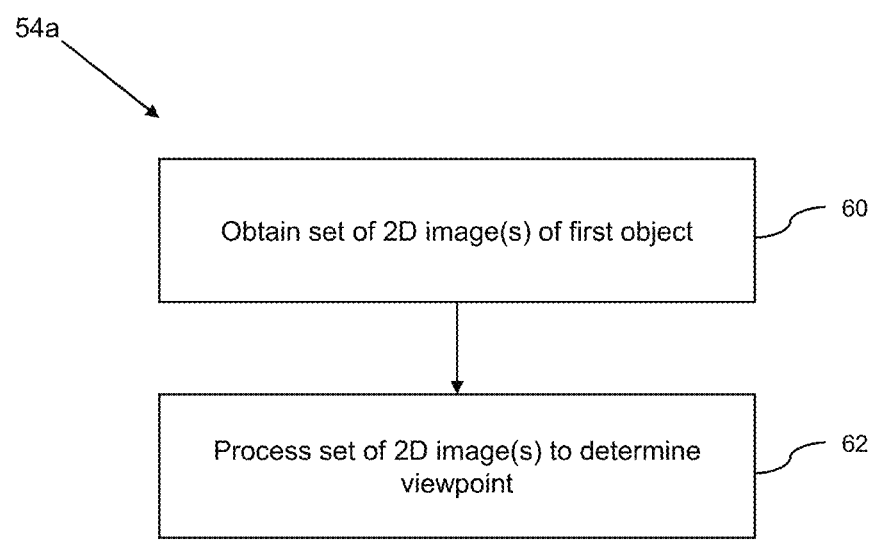
FIG. 4 is a flow chart illustrating an example set of computer executable instructions that can be executed for processing a set of one or more 2D images of a first object to determine a viewpoint to use in generating 2D images of a second object.

Referring now to FIG. 4, a flow chart is provided illustrating example computer executable instructions that can be implemented in executing block 54 of FIG. 3, denoted block 54a in FIG. 4. At block 60, the image processing module 22 obtains the input set of 2D images 36 of the first object. For example, the user may have input one or more real-world images of the product or identified aspects of a product having a desirable look and feel. That is, the input set of 2D images 36 can be input directly or other input data entered to enable the image processing module 22 to determine whether to utilize a machine learning model for a similar product or product type, which has been trained using sets or collections of images from, for example, one or more third party image databases 34. The image processing module 22 then processes the input set of 2D images 36 at block 62 to determine the viewpoint of the product(s) in the image(s). For example, an image processing technique can be applied to determine the view angle and an estimated level of zoom required to achieve what is shown in the input set of 2D images 36. That is, in FIG. 4, the image processing module 22 applies an image processing technique to determine the viewpoint and any other image processing parameters 38 directly from the input set of 2D images 36.

Figure 5:
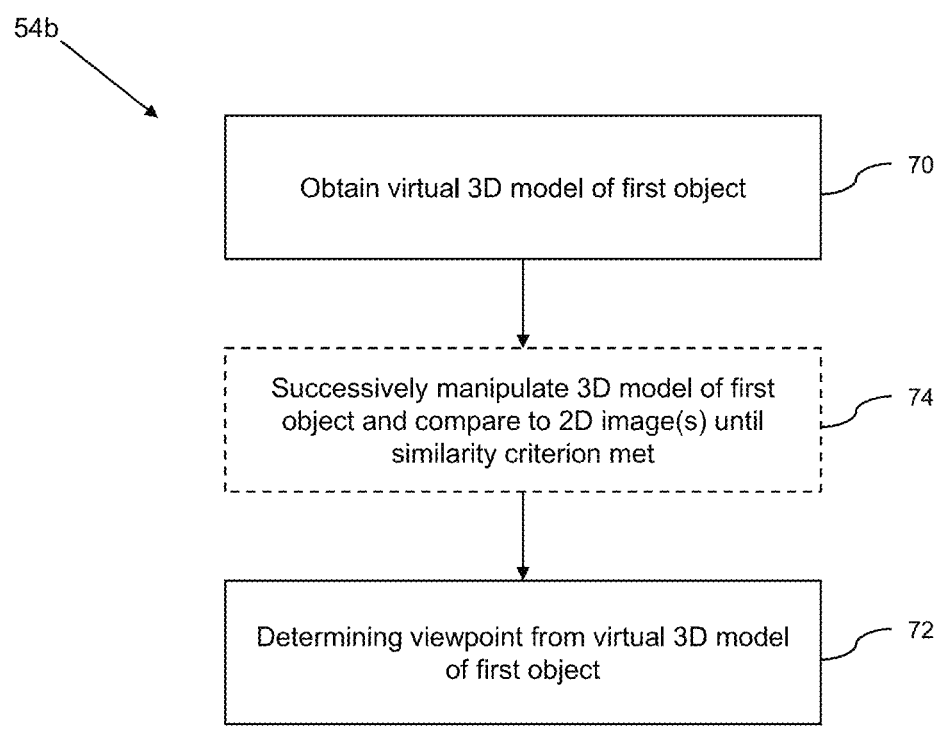
FIG. 5 is a flow chart illustrating an example set of computer executable instructions that can be executed for using a virtual 3D model of a first object to determine a viewpoint to use in generating 2D images of a second object.

Referring now to FIG. 5, a flow chart is provided illustrating example computer executable instructions that can be implemented in executing block 54 of FIG. 3 in another manner, denoted block 54b in FIG. 5. At block 70, a virtual 3D model 40 of the first object is obtained. The virtual 3D model 40 may exist or need to be generated using the input set of 2D images 36. In one example embodiment, the image processing module 22 may receive both the input set of 2D images 36 and the corresponding virtual 3D model 40 of the first object. In other example embodiments, the image processing module 22 may use the 2D image loader 20 to obtain the input set of 2D images 36 and then use the 3D modeler 18 to generate the virtual 3D model 40, which can be used to determine the viewpoint of the first object that is to provide the baseline from which 2D images of subsequent products are obtained at block 72. That is, in FIG. 5, the image processing module 22 has access to both the input set of 2D images 36 and the virtual 3D model 40. If the virtual 3D model 40 is arranged to have the desired viewpoint (which can be done at time or in advance), the viewpoint can be determined directly at block 72. Such arrangement (or prearrangement) can be based on a baseline view that arranges the virtual 3D model 40 in a particular way, which can be refined to more closely approximate the viewpoint seen in the input set of 2D images 36. If the virtual 3D model 40 is not arranged or is generated from the input set of 2D images 36, the virtual 3D model 40 may need to be manipulated to approximate the viewpoint(s) seen in the input set of 2D images 36.

For example, at block 74, the 3D modeler 18 can be used to render the virtual 3D model 40 and the image processing module 22 can successively manipulate the virtual 3D model 40 of the first object and compare the successive manipulations to the input set of 2D images 36 to iteratively determine if a similarity criterion has been met in order to find the parameters of the 3D model 40 that can achieve what is shown in the input set of 2D images 36. The similarity criterion can differ based on the imaging processing technique applied in order to perform the successive manipulations. For example, a contour in the set of 2D images 36 can be used to find a view angle by adjusting the orientation of the virtual 3D model 40 until the contour appears sufficiently similar in both the baseline 2D image 36 and the current orientation of the virtual 3D model 40. Other techniques can also be applied. For example, the 3D modeler 18 can have stock views that can be applied to the virtual 3D model 40, such as top view, perspective view, side view, etc., which can be used to provide a starting point for the comparison with a 2D image 36 labeled as being (or being approximately) that view. The 2D image 36 can be tagged by the user or approximated by the image processing module 22 as a perspective view and the stock perspective view parameters applied to the virtual 3D model 40 to accelerate the successive manipulation. Moreover, the successive manipulation in block 74 can be an automated process applied by the 3D modeler 18 or can be performed manually by a user. For example, the virtual 3D model 40 may be rotated, zoomed, etc. by the user until it meets the similarly criterion and is highlighted in green to indicate that the user has found the desired viewpoint. Once the virtual 3D model 40 is arranged the desired manner, the viewpoint and corresponding parameters that could be applied to other virtual 3D models of other objects are determined so that they may be applied to the virtual 3D model 42 of the second object. This may include one or more in any combination, all, or none of the following, namely determining a consistent coordinate system and set of coordinates that can achieve the same viewpoint, any scaling or zoom factors applied to achieve an image depth, focus, level of detail, sharpness, etc.

Figure 6:
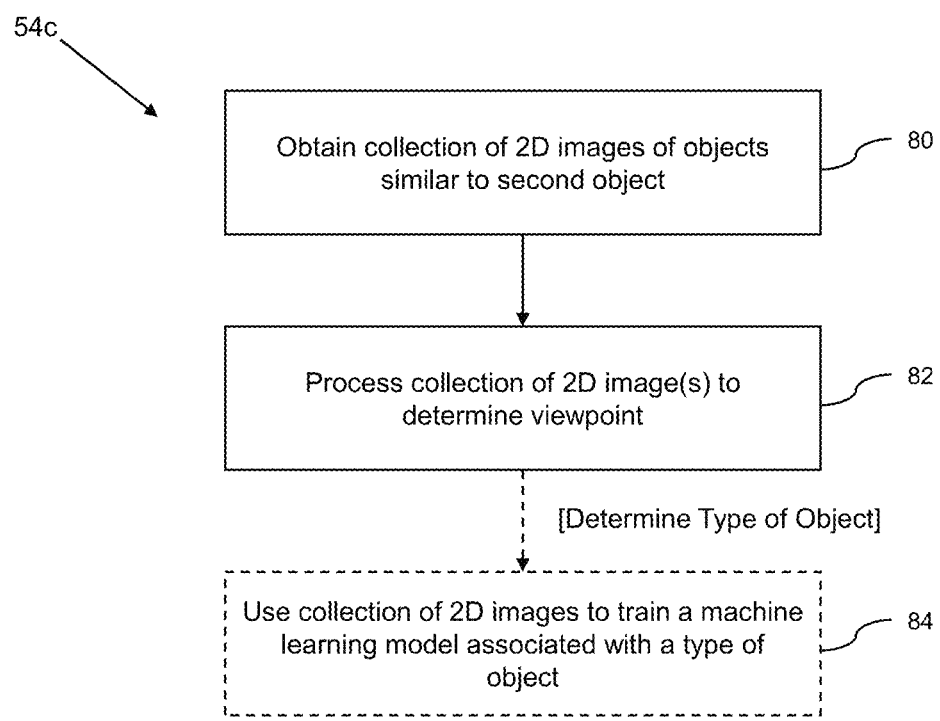
FIG. 6 is a flow chart illustrating an example set of computer executable instructions that can be executed for using a collection of 2D images of objects similar to a first object to determine a viewpoint to use in generating 2D images of a second object.

Referring now to FIG. 6, a flow chart is provided illustrating example computer executable instructions that can be implemented in executing block 54 of FIG. 3 in yet another manner, denoted block 54c in FIG. 6. In the example shown in FIG. 6, the image processing module 22 relies on 2D images of other similar objects to determine how to arrange the second object. At block 80 the image processing module 22 obtains a collection of 2D images 36 of objects similar to the second object for which a virtual photo shoot is desired. For example, the user may indicate that they would like to have a virtual photo shoot taken of their product based on popular views or stylistic elements of similar products. In this way, the image processing module 22 determines the imaging parameters 38 for the first object based on a collection or corpus of 2D images, e.g., by accessing the third party image database 34. The collection of 2D images can be curated over time based on product type and used by other users to determine viewpoints for other products. At block 82, the collection of 2D images is used to determine the viewpoint. This can be done by selecting a most desirable image or averaging certain features (such as view angle) to find an approximation that can be applied to the second object. It can be appreciated that block 82 can also include obtaining or generating a corresponding virtual 3D model to determine the parameters to apply to the virtual 3D model 42 of the second object. Alternatively, techniques such as those discussed above in relation to FIG. 4 can be used to determine the viewpoint directly from the collection of images. The machine learning tool 32 can also be used at block 82 to use the collection of 2D images 36 to determine a product, product type or other characteristic to find a corresponding machine learning model that can inform the image processing module 22 of the appropriate imaging parameters 38 as discussed above. Optionally, at block 84, the image processing module 22 can instruct or use the machine learning tool 32 to determine a type of object from the collection of 2D images and use those images to create, train, or refine a machine learning model associated with the type of object. In this way, the image processing module 22 can use each iteration of the method to further refine and update the trained model to determine desirable viewpoints of objects based on object type. For example, in a future use of the virtual photo shoot application 12, the image processing module 22 can determine, automatically or by way of input, an object type, find a corresponding machine learning model, and utilize the machine learning model to determine the viewpoint to be applied to the second object, at block 82.

Figure 7A:
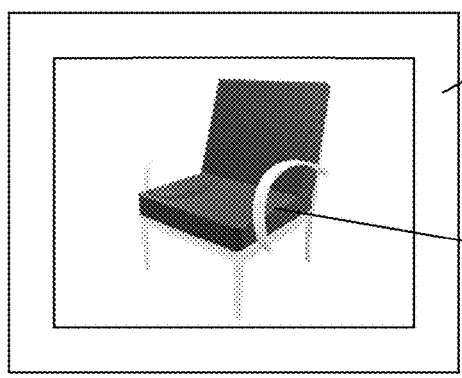
FIGS. 7*a* to 7*d* show examples of a set of 2D images of a first object.
Figure 7B:
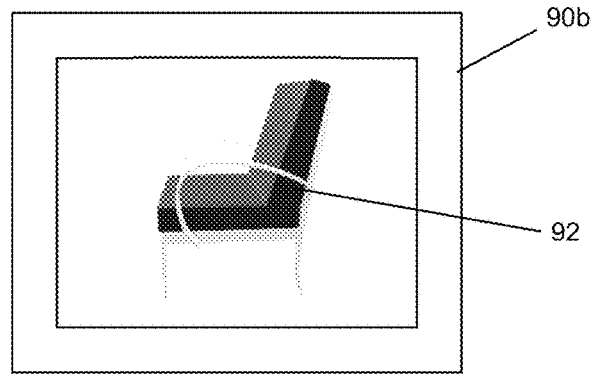
Figure 7C:
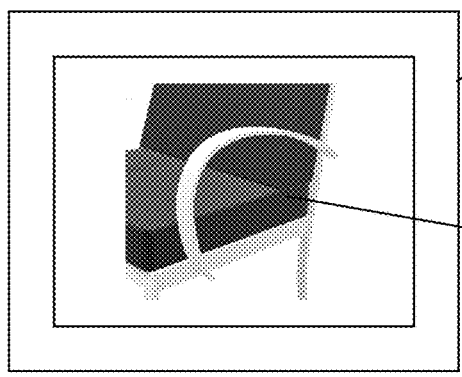
Figure 7D:
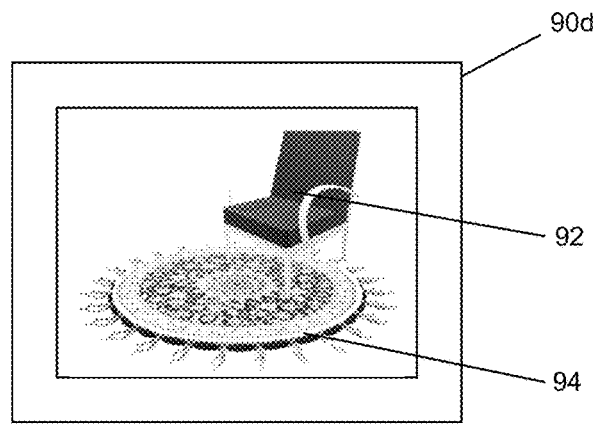

FIGS. 7a, 7b, 7c, and 7d illustrate an example of a set of input 2D images 90a, 90b, 90d of a first object, in this example a chair 92. In this example, it is assumed that this set of 2D images 90a-90d is a desired baseline set of images that the user would like to replicate or mimic in a second object, for example, another chair or similar piece of furniture. FIG. 7a illustrates the chair 92 in a front perspective view with a zoom level that shows the entire chair 92. FIG. 7b includes a similar zoom level but shows the chair 92 from a side view. FIG. 7c provides a zoomed in view of the arm of the chair 92 in the perspective orientation. FIG. 7d provides a view of the chair 92 with a rug 94. That is, FIG. 7d illustrates the chair 92 in a virtual scene with at least one other object.

Figure 8A:
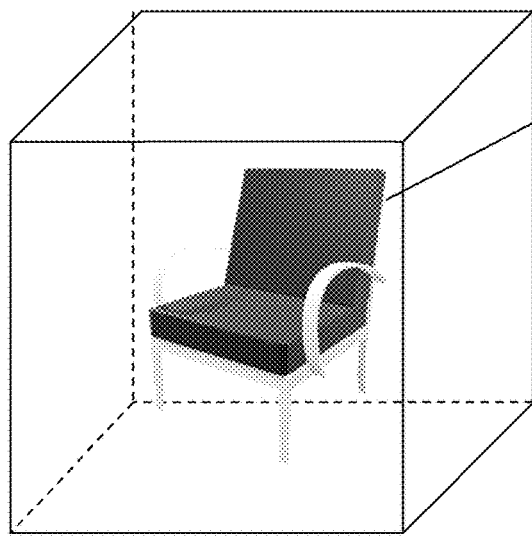
FIG. 8*a* shows a first virtual 3D model of a first object, which corresponds to a first image in the set of images of the first object.
Figure 8B:
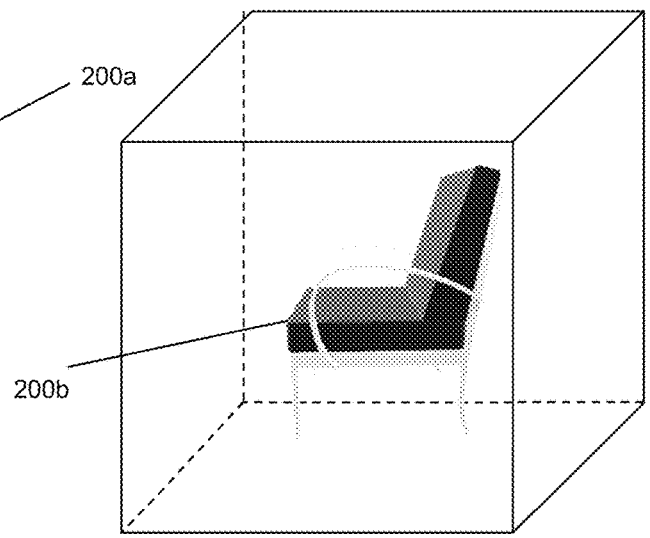
FIG. 8*b* shows a second virtual 3D model of a first object, which corresponds to a second image in the set of images of the first object.
Figure 9:
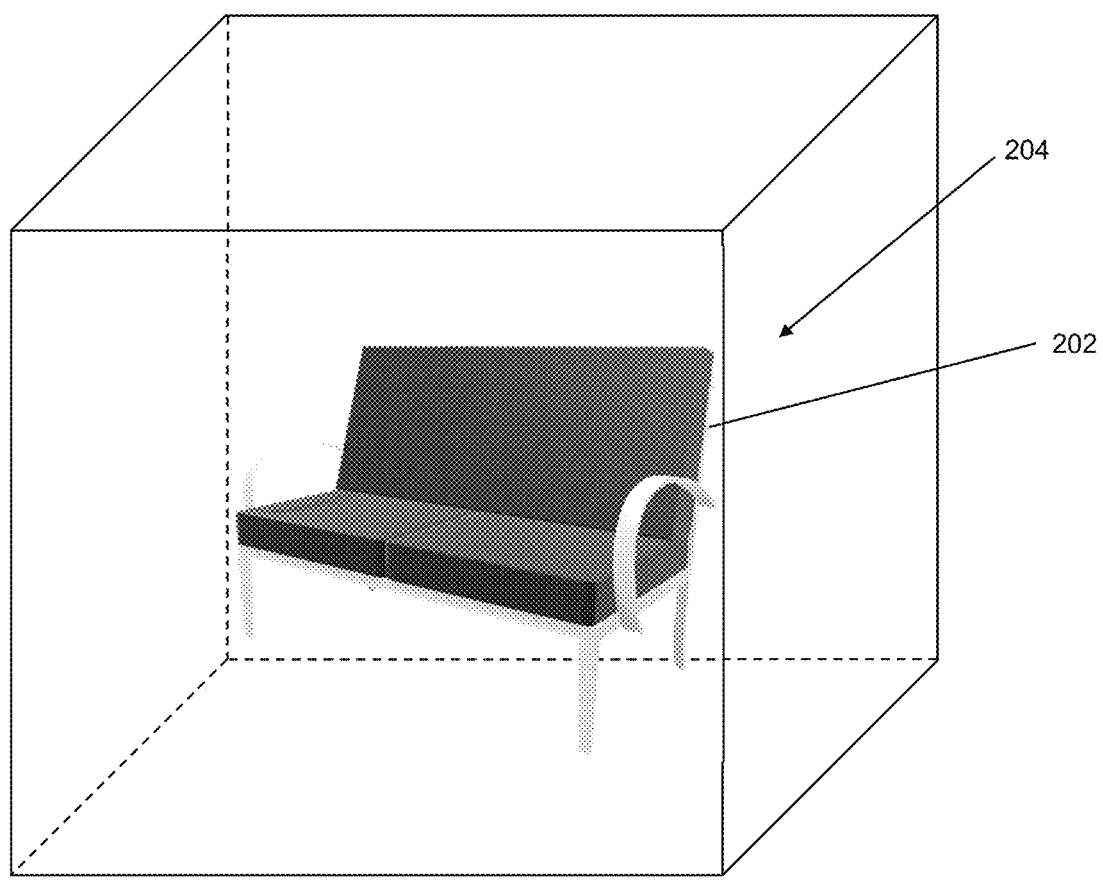
FIG. 9 shows a virtual 3D model of a second object, which has been arranged according to a viewpoint determined from the first virtual 3D model of the first object as shown in FIG. 8*a*.
Figure 10A:
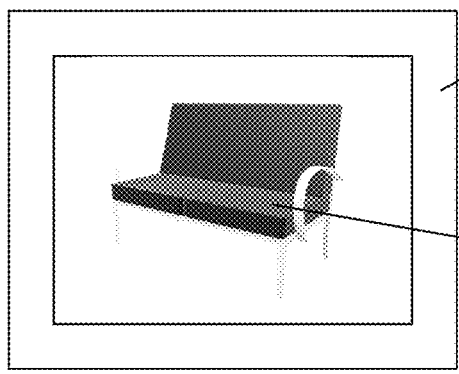
FIGS. 10*a* to 10*d* show examples of a set of 2D images of the second object, shown in FIG. 9.
Figure 10B:
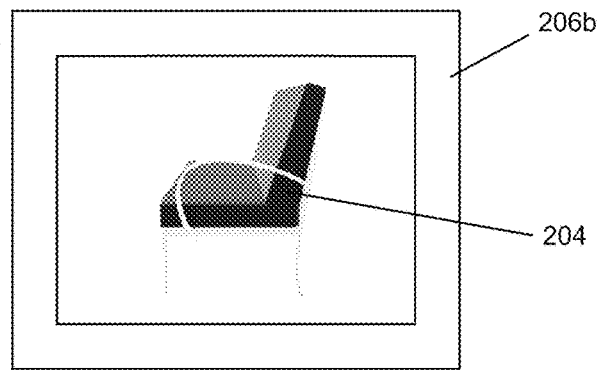
Figure 10C:
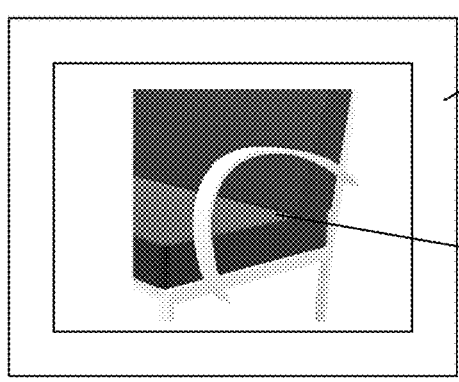
Figure 10D:
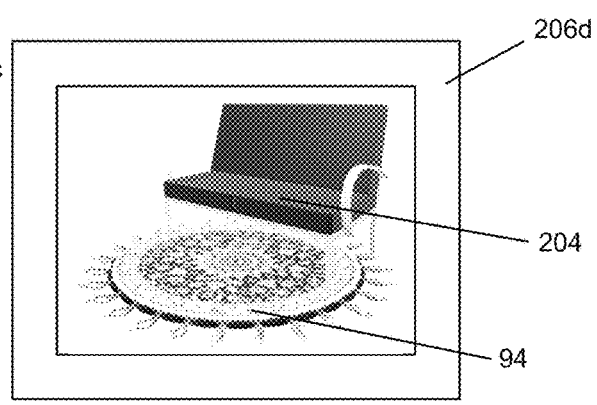

FIG. 8a illustrates a 3D model 200a of the chair 92 according to the viewpoint shown in FIG. 7a, and FIG. 8b illustrates a 3D model 200b of the chair 92 according to the viewpoint shown in FIG. 8b. The 3D models 200a, 200b are shown in the same viewpoints as the images 90a, 90b and thus the 3D models 200a, 200b include similar viewpoints or were generated and/or successively manipulated to be similar. Using FIG. 8a as an example, the 3D model 200a can be used to determine the viewpoint and other imaging parameters that can be applied to a virtual 3D model 202 of a second object, in this example a couch 204 having a similar style to the chair 92 as seen in FIG. 9. The 3D modeler 18 can use the orientation and zoom parameters determined from the virtual 3D model 200a (i.e., of the chair 92 as shown in FIG. 8a) to determine how to arrange the couch 204 using its virtual 3D model 202. The arrangement shown in FIG. 9 can then be used to generate the 2D image 206a shown in FIG. The 3D model 202 in FIG. 9 can then be manipulated to obtain a similar arrangement to that shown in FIG. 8b in order to generate the 2D image 206b shown in FIG. 10b. The 2D image 206c shown in FIG. 10c can likewise be generated by further manipulating the 3D model 202. As shown in FIG. 10d, the couch 204 is shown with the same rug 94 as the chair 92 was depicted in FIG. 8d. It can be appreciated that other objects can also be rendered with the second object (i.e., the couch 204 in this example) in capturing the output set of 2D images 44.

A virtual photo shoot as described above can involve one or multiple objects 26. For multiple objects 26, the scenarios and techniques described above can be applied to each of the objects 26 in succession or in parallel. That is, multiple objects 26 that are to be staged in a scene can be processed individually and a composite scene generated from multiple virtual 3D models 40, arranged together. For example, a merchant may want to show a set of products together like a couch and loveseat. The image processing module 22 can be configured to determine a set of imaging parameters 38 for each of the products in the virtual photo shoot. This may require a manual identification of the multiple products or the application of an object detection process to isolate the products and then apply the above-described techniques based on the nature of the input set of 2D images 36. For example, an image processing technique can be applied to a set of real-world 2D images showing a couch and loveseat to detect the objects and have parallel processes initiated to determine the corresponding set of imaging parameters 38 to apply to the respective 3D models 40 of those products. This may include offset factors to account for an "arrangement"

that is indicative of how certain product sets should be shown when together. That is, a couch shown with a loveseat may be angled differently than if it is shown in isolation. In this way, the 3D virtual scene can be composed of multiple objects and arranged to replicate the desired input set of one or more 2D images 36, and this composition can then be used over and over again to create consistency, e.g., across multiple product lines.

Figure 11:
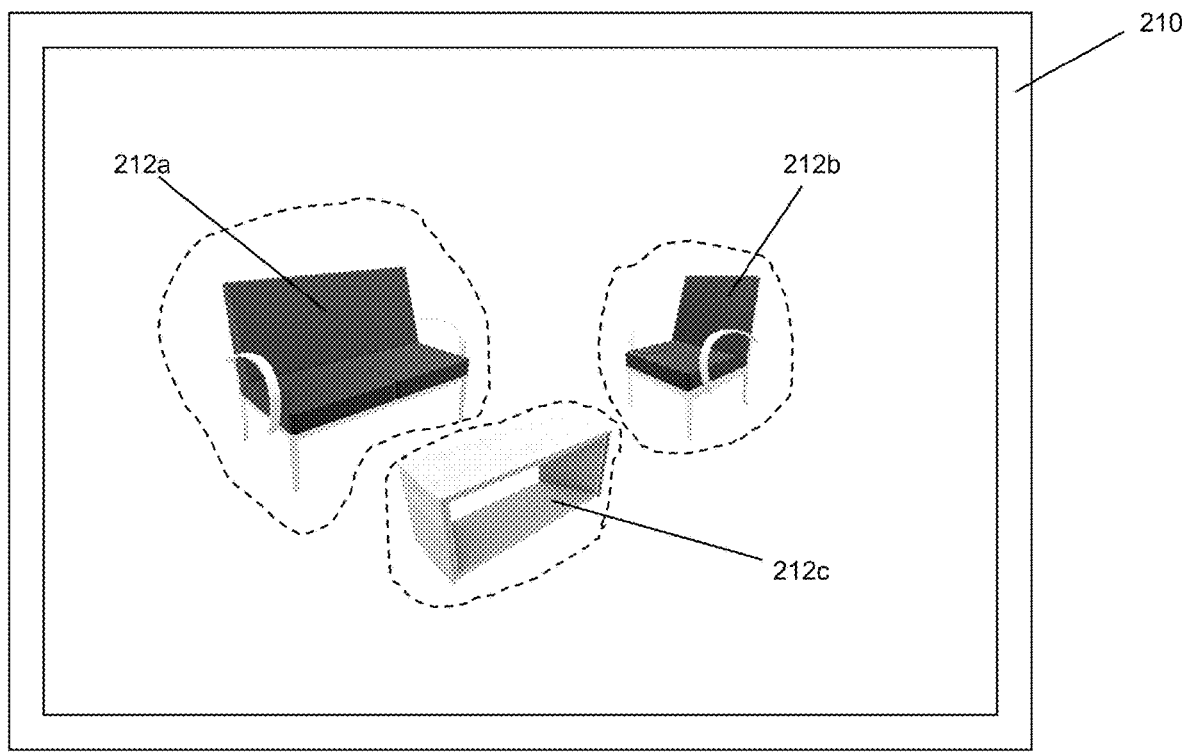
FIG. 11 shows an image comprising a composite set of objects.
Figure 12:
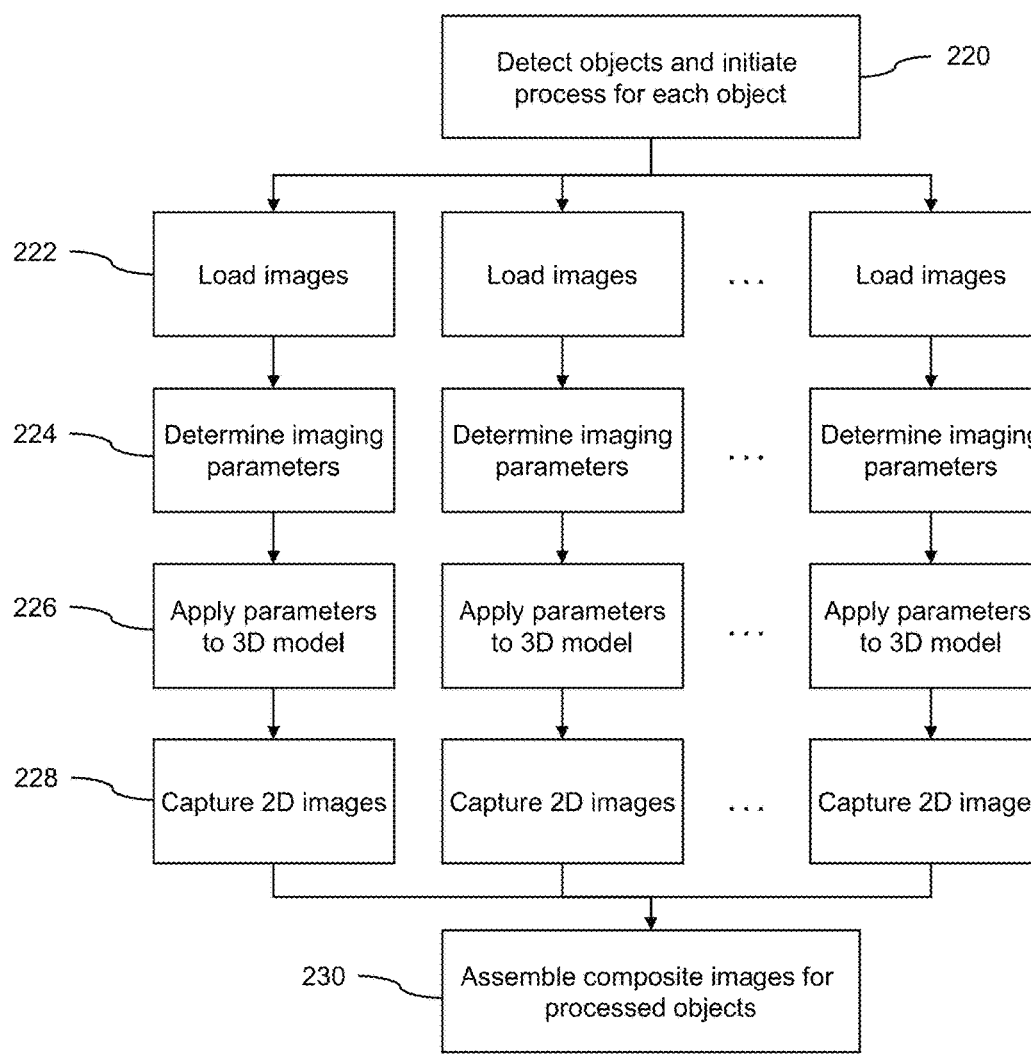
FIG. 12 is a flow chart illustrating an example set of computer executable instructions that can be executed for processing a plurality of objects determined from a composite image that includes the plurality of objects.
Figure 13:
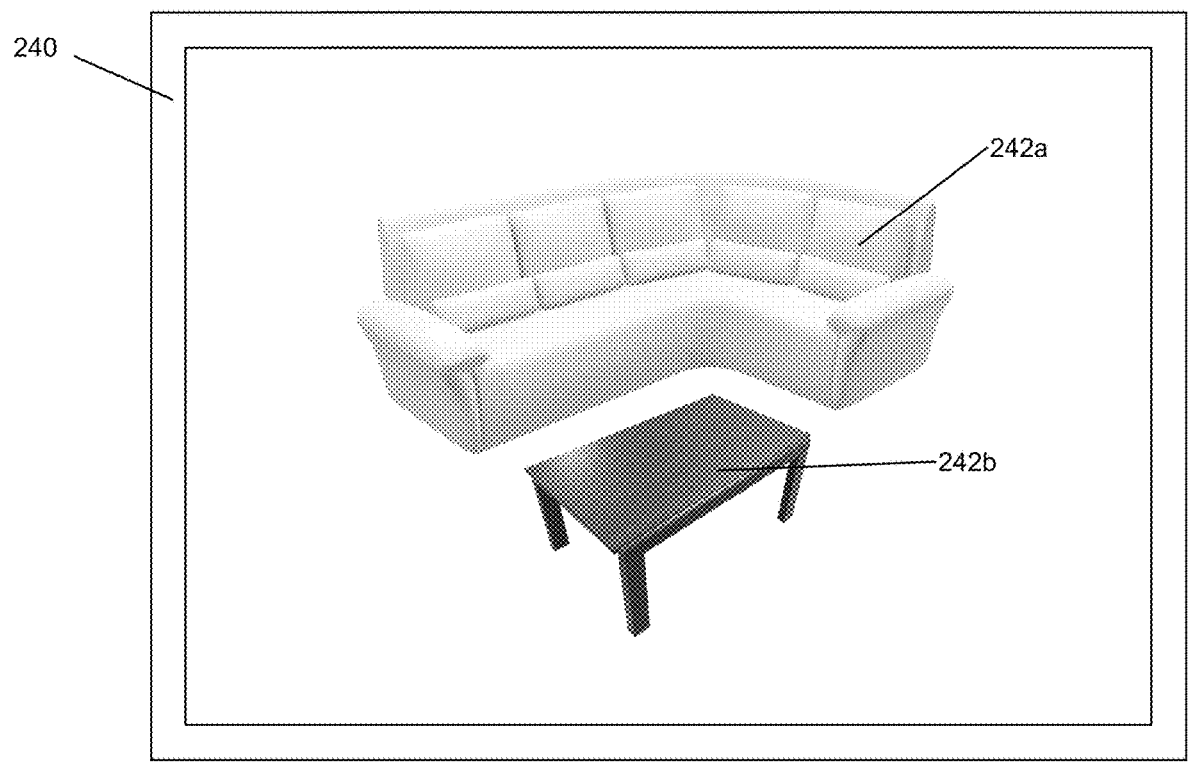
FIG. 13 shows a composite image generated by processing multiple objects from the plurality of objects shown in the composite image of FIG. 11.

Referring now to FIGS. 11-13, an example of processing a composite scene is illustrated. In FIG. 11 an image 210 depicting a scene with multiple objects 212 is shown, in this example a first object 212*a* corresponding to a couch, a second object 212*b* corresponding to a chair, and a third object 212*c* corresponding to a coffee table. The image processing module 22 can process the input 2D image 210 to detect the distinct objects as illustrated using dashed blobs in FIG. 11 for ease of illustration. It can be appreciated that the image processing module 22 can also request that the user select or otherwise identify the distinct objects, e.g., by selecting or isolating the objects using a tracing tool.

FIG. 12 illustrates a parallel processing technique that can be applied to multiple objects in a composite scene. At block 220 the image processing module 22 detects the objects and initiates the presently described process for each object. In each parallel process, the image processing module 22 loads one or more 2D images at block 222 and determines the imaging parameters 38 at block 224, e.g., as described above. The image processing module 22 may then apply the imaging parameters 38 to the virtual 3D model of the second object at block 226 and generate the 2D images 44 at block 228. With these operations having been applied to each of the objects, the desired arrangement of each object has been captured and the output 2D images 44 can be assembled at block 230 to create the composite scene. It can be appreciated that the parallel processing shown in FIG. 12 can be repeated for multiple viewpoints of the same composite scene. For example, the image 210 shown in FIG. 11 can be one of a series of viewpoints of the composite scene that can be determined for a next object. FIG. 13 illustrates a second composite scene that has been generated to include the same look and feel as that shown in FIG. 11. However, it can be seen that fewer objects 242*a*, 242*b* in the second composite scene 240 are used since the seating includes a sectional couch 242*a* which takes up the same amount of room as the couch and chair from the first composite scene 210. A coffee table 242*b* from the second composite scene 240 is also shown. As such, it can be appreciated that in a composite scene for which a virtual photo shoot is applied may have different numbers of objects depending on other parameters such as size and layout constraints as in this example.

An Example e-Commerce Platform

Although integration with a commerce platform is not required, in some embodiments, the methods disclosed herein may be performed on or in association with a commerce platform such as an e-commerce platform. Therefore, an example of a commerce platform will be described.

Figure 14:
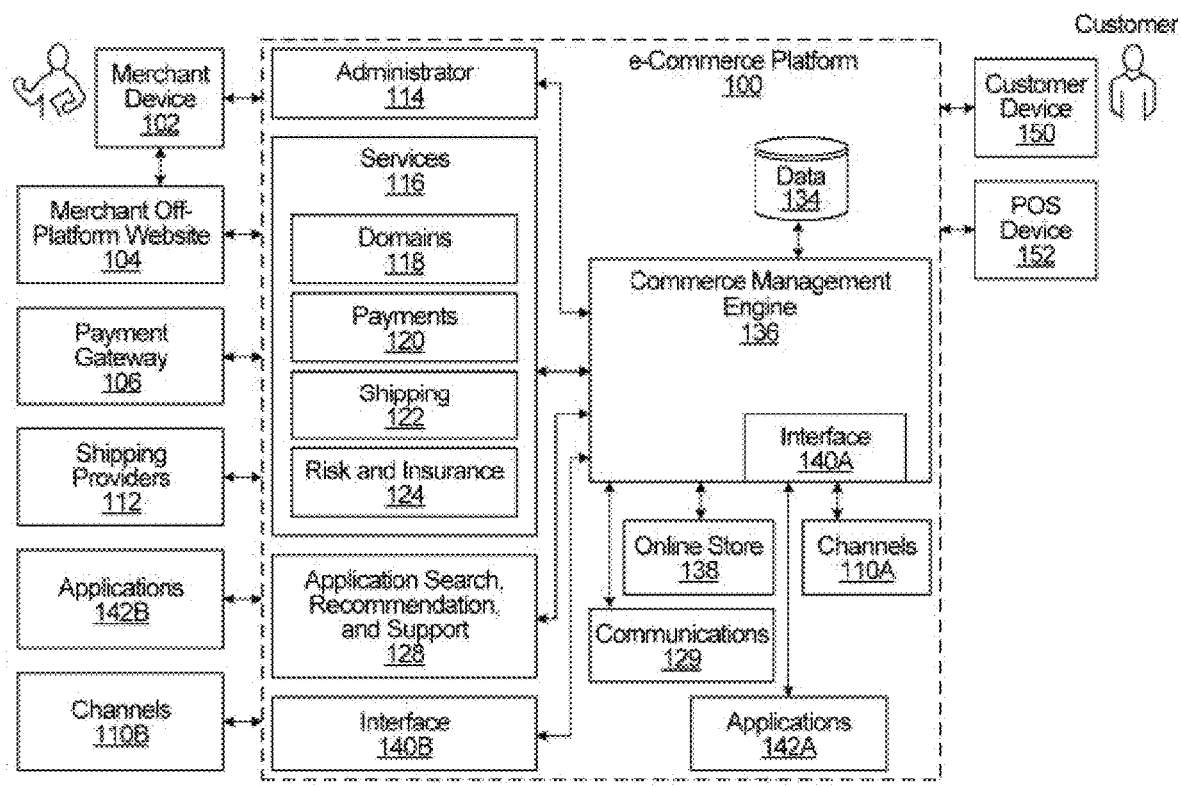
FIG. 14 is a block diagram illustrating an example of a configuration for an e-commerce platform.

FIG. 14 illustrates an example e-commerce platform 100, according to one embodiment. The e-commerce platform 100 may be used to provide merchant products and services to customers. While the disclosure contemplates using the apparatus, system, and process to purchase products and services, for simplicity the description herein will refer to products. All references to products throughout this disclosure should also be understood to be references to products and/or services, including, for example, physical products, digital content (e.g., music, videos, games), software, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, consumer, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like. Furthermore, it may be recognized that while a given user may act in a given role (e.g., as a merchant) and their associated device may be referred to accordingly (e.g., as a merchant device) in one context, that same individual may act in a different role in another context (e.g., as a customer) and that same or another associated device may be referred to accordingly (e.g., as a customer device). For example, an individual may be a merchant for one type of product (e.g., shoes), and a customer/consumer of other types of products (e.g., groceries). In another example, an individual may be both a consumer and a merchant of the same type of product. In a particular example, a merchant that trades in a particular category of goods may act as a customer for that same category of goods when they order from a wholesaler (the wholesaler acting as merchant).

The e-commerce platform 100 provides merchants with online services/facilities to manage their business. The facilities described herein are shown implemented as part of the platform 100 but could also be configured separately from the platform 100, in whole or in part, as stand-alone services. Furthermore, such facilities may, in some embodiments, may, additionally or alternatively, be provided by one or more providers/entities.

In the example of FIG. 14, the facilities are deployed through a machine, service or engine that executes computer software, modules, program codes, and/or instructions on one or more processors which, as noted above, may be part of or external to the platform 100. Merchants may utilize the e-commerce platform 100 for enabling or managing commerce with customers, such as by implementing an e-commerce experience with customers through an online store 138, applications 142A-B, channels 110A-B, and/or through point of sale (POS) devices 152 in physical locations (e.g., a physical storefront or other location such as through a kiosk, terminal, reader, printer, 3D printer, and the like). A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform 100), an application 142B, and the like. However, even these 'other' merchant commerce facilities may be incorporated into or communicate with the e-commerce platform 100, such as where POS devices 152 in a physical store of a merchant are linked into the e-commerce platform 100, where a merchant off-platform website 104 is tied into the e-commerce platform 100, such as, for example, through 'buy buttons' that link content from the merchant off platform website 104 to the online store 138, or the like.

The online store 138 may represent a multi-tenant facility comprising a plurality of virtual storefronts. In embodiments, merchants may configure and/or manage one or more storefronts in the online store 138, such as, for example, through a merchant device 102 (e.g., computer, laptop computer, mobile computing device, and the like), and offer products to customers through a number of different channels 110A-B (e.g., an online store 138; an application 142A-B; a physical storefront through a POS device 152; an electronic marketplace, such, for example, through an electronic buy button integrated into a website or social media channel such as on a social network, social media page, social media messaging system; and/or the like). A merchant may sell across channels 110A-B and then manage their sales through the e-commerce platform 100, where channels 110A may be provided as a facility or service internal or external to the e-commerce platform 100. A merchant may, additionally or alternatively, sell in their physical retail store, at pop ups, through wholesale, over the phone, and the like, and then manage their sales through the e-commerce platform 100. A merchant may employ all or any combination of these operational modalities. Notably, it may be that by employing a variety of and/or a particular combination of modalities, a merchant may improve the probability and/or volume of sales. Throughout this disclosure the terms online store 138 and storefront may be used synonymously to refer to a merchant's online e-commerce service offering through the e-commerce platform 100, where an online store 138 may refer either to a collection of storefronts supported by the e-commerce platform 100 (e.g., for one or a plurality of merchants) or to an individual merchant's storefront (e.g., a merchant's online store).

In some embodiments, a customer may interact with the platform 100 through a customer device 150 (e.g., computer, laptop computer, mobile computing device, or the like), a POS device 152 (e.g., retail device, kiosk, automated (self-service) checkout system, or the like), and/or any other commerce interface device known in the art. The e-commerce platform 100 may enable merchants to reach customers through the online store 138, through applications 142A-B, through POS devices 152 in physical locations (e.g., a merchant's storefront or elsewhere), to communicate with customers via electronic communication facility 129, and/or the like so as to provide a system for reaching customers and facilitating merchant services for the real or virtual pathways available for reaching and interacting with customers.

In some embodiments, and as described further herein, the e-commerce platform 100 may be implemented through a processing facility. Such a processing facility may include a processor and a memory. The processor may be a hardware processor. The memory may be and/or may include a non-transitory computer-readable medium. The memory may be and/or may include random access memory (RAM) and/or persisted storage (e.g., magnetic storage). The processing facility may store a set of instructions (e.g., in the memory) that, when executed, cause the e-commerce platform 100 to perform the e-commerce and support functions as described herein. The processing facility may be or may be a part of one or more of a server, client, network infrastructure, mobile computing platform, cloud computing platform, stationary computing platform, and/or some other computing platform, and may provide electronic connectivity and communications between and amongst the components of the e-commerce platform 100, merchant devices 102, payment gateways 106, applications 142A-B, channels 110A-B, shipping providers 112, customer devices 150, point of sale devices 152, etc. In some implementations, the processing facility may be or may include one or more such computing devices acting in concert. For example, it may be that a plurality of co-operating computing devices serves as/to provide the processing facility. The e-commerce platform 100 may be implemented as or using one or more of a cloud computing service, software as a service (SaaS), infrastructure as a service (IaaS), platform as a service (PaaS), desktop as a service (DaaS), managed software as a service (MSaaS), mobile backend as a service (MBaaS), information technology management as a service (ITMaaS), and/or the like. For example, it may be that the underlying software implementing the facilities described herein (e.g., the online store 138) is provided as a service, and is centrally hosted (e.g., and then accessed by users via a web browser or other application, and/or through customer devices 150, POS devices 152, and/or the like). In some embodiments, elements of the e-commerce platform 100 may be implemented to operate and/or integrate with various other platforms and operating systems.

In some embodiments, the facilities of the e-commerce platform 100 (e.g., the online store 138) may serve content to a customer device 150 (using data 134) such as, for example, through a network connected to the e-commerce platform 100. For example, the online store 138 may serve or send content in response to requests for data 134 from the customer device 150, where a browser (or other application) connects to the online store 138 through a network using a network communication protocol (e.g., an internet protocol). The content may be written in machine readable language and may include Hypertext Markup Language (HTML), template language, JavaScript, and the like, and/or any combination thereof.

In some embodiments, online store 138 may be or may include service instances that serve content to customer devices and allow customers to browse and purchase the various products available (e.g., add them to a cart, purchase through a buy-button, and the like). Merchants may also customize the look and feel of their website through a theme system, such as, for example, a theme system where merchants can select and change the look and feel of their online store 138 by changing their theme while having the same underlying product and business data shown within the online store's product information. It may be that themes can be further customized through a theme editor, a design interface that enables users to customize their website's design with flexibility. Additionally or alternatively, it may be that themes can, additionally or alternatively, be customized using theme-specific settings such as, for example, settings as may change aspects of a given theme, such as, for example, specific colors, fonts, and pre-built layout schemes. In some implementations, the online store may implement a content management system for website content. Merchants may employ such a content management system in authoring blog posts or static pages and publish them to their online store 138, such as through blogs, articles, landing pages, and the like, as well as configure navigation menus. Merchants may upload images (e.g., for products), video, content, data, and the like to the e-commerce platform 100, such as for storage by the system (e.g., as data 134). In some embodiments, the e-commerce platform 100 may provide functions for manipulating such images and content such as, for example, functions for resizing images, associating an image with a product, adding and associating text with an image, adding an image for a new product variant, protecting images, and the like.

As described herein, the e-commerce platform 100 may provide merchants with sales and marketing services for products through a number of different channels 110A-B, including, for example, the online store 138, applications 142A-B, as well as through physical POS devices 152 as described herein. The e-commerce platform 100 may, additionally or alternatively, include business support services 116, an administrator 114, a warehouse management system, and the like associated with running an on-line business, such as, for example, one or more of providing a domain registration service 118 associated with their online store, payment services 120 for facilitating transactions with a customer, shipping services 122 for providing customer shipping options for purchased products, fulfillment services for managing inventory, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some embodiments, the e-commerce platform 100 may be configured with shipping services 122 (e.g., through an e-commerce platform shipping facility or through a third-party shipping carrier), to provide various shipping-related information to merchants and/or their customers such as, for example, shipping label or rate information, real-time delivery updates, tracking, and/or the like.

Figure 15:
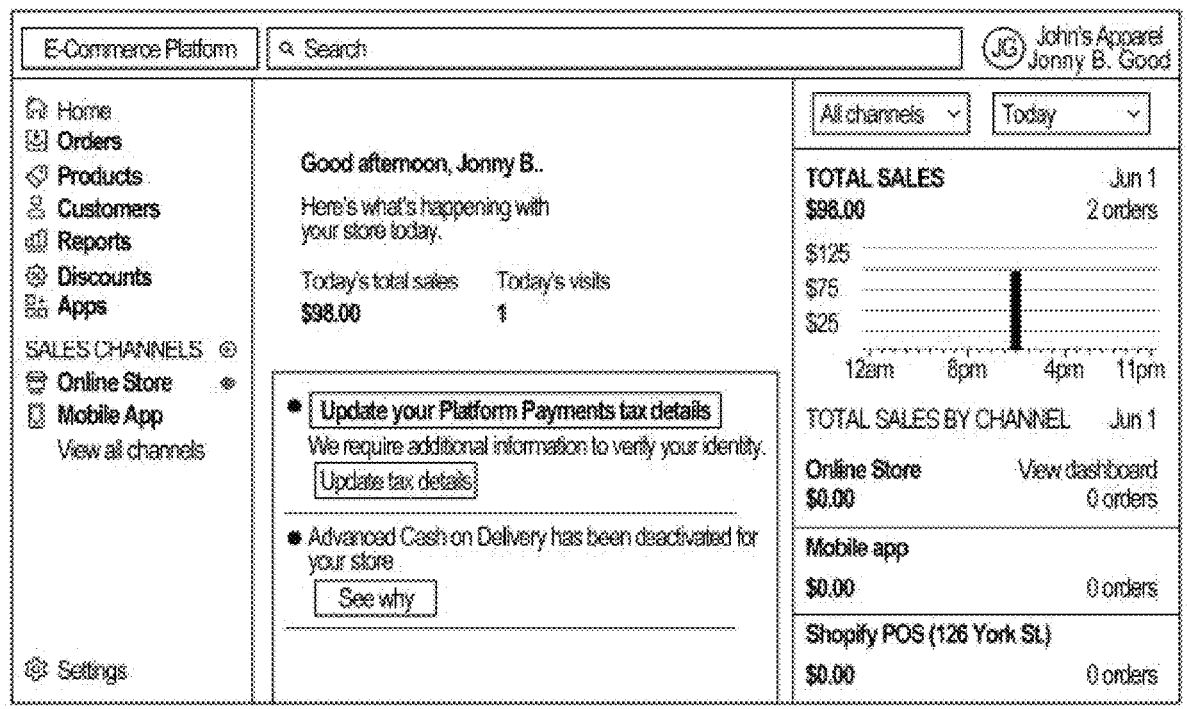
FIG. 15 shows an example of a user interface for interacting with the e-commerce platform shown in FIG. 14.

FIG. 15 depicts a non-limiting embodiment for a home page of an administrator 114. The administrator 114 may be referred to as an administrative console and/or an administrator console. The administrator 114 may show information about daily tasks, a store's recent activity, and the next steps a merchant can take to build their business. In some embodiments, a merchant may log in to the administrator 114 via a merchant device 102 (e.g., a desktop computer or mobile device), and manage aspects of their online store 138, such as, for example, viewing the online store's 138 recent visit or order activity, updating the online store's 138 catalog, managing orders, and/or the like. In some embodiments, the merchant may be able to access the different sections of the administrator 114 by using a sidebar, such as the one shown on FIG. 15. Sections of the administrator 114 may include various interfaces for accessing and managing core aspects of a merchant's business, including orders, products, customers, available reports and discounts. The administrator 114 may, additionally or alternatively, include interfaces for managing sales channels for a store including the online store 138, mobile application(s) made available to customers for accessing the store (Mobile App), POS devices, and/or a buy button. The administrator 114 may, additionally or alternatively, include interfaces for managing applications (apps) installed on the merchant's account; and settings applied to a merchant's online store 138 and account. A merchant may use a search bar to find products, pages, or other information in their store.

More detailed information about commerce and visitors to a merchant's online store 138 may be viewed through reports or metrics. Reports may include, for example, acquisition reports, behavior reports, customer reports, finance reports, marketing reports, sales reports, product reports, and custom reports. The merchant may be able to view sales data for different channels 110A-B from different periods of time (e.g., days, weeks, months, and the like), such as by using drop-down menus. An overview dashboard may also be provided for a merchant who wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, order updates, and the like. Notifications may be provided to assist a merchant with navigating through workflows configured for the online store 138, such as, for example, a payment workflow, an order fulfillment workflow, an order archiving workflow, a return workflow, and the like.

The e-commerce platform 100 may provide for a communications facility 129 and associated merchant interface for providing electronic communications and marketing, such as utilizing an electronic messaging facility for collecting and analyzing communication interactions between merchants, customers, merchant devices 102, customer devices 150, POS devices 152, and the like, to aggregate and analyze the communications, such as for increasing sale conversions, and the like. For instance, a customer may have a question related to a product, which may produce a dialog between the customer and the merchant (or an automated processor-based agent/chatbot representing the merchant), where the communications facility 129 is configured to provide automated responses to customer requests and/or provide recommendations to the merchant on how to respond such as, for example, to improve the probability of a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between the e-commerce platform 100 and a merchant's bank account, and the like. The financial facility 120 may also provide merchants and buyers with financial support, such as through the lending of capital (e.g., lending funds, cash advances, and the like) and provision of insurance. In some embodiments, online store 138 may support a number of independently administered storefronts and process a large volume of transactional data on a daily basis for a variety of products and services. Transactional data may include any customer information indicative of a customer, a customer account or transactions carried out by a customer such as, for example, contact information, billing information, shipping information, returns/refund information, discount/offer information, payment information, or online store events or information such as page views, product search information (search keywords, click-through events), product reviews, abandoned carts, and/or other transactional information associated with business through the e-commerce platform 100. In some embodiments, the e-commerce platform 100 may store this data in a data facility 134. Referring again to FIG. 14, in some embodiments the e-commerce platform 100 may include a commerce management engine 136 such as may be configured to perform various workflows for task automation or content management related to products, inventory, customers, orders, suppliers, reports, financials, risk and fraud, and the like. In some embodiments, additional functionality may, additionally or alternatively, be provided through applications 142A-B to enable greater flexibility and customization required for accommodating an ever-growing variety of online stores, POS devices, products, and/or services. Applications 142A may be components of the e-commerce platform 100 whereas applications 142B may be provided or hosted as a third-party service external to e-commerce platform 100. The commerce management engine 136 may accommodate store-specific workflows and in some embodiments, may incorporate the administrator 114 and/or the online store 138.

Implementing functions as applications 142A-B may enable the commerce management engine 136 to remain responsive and reduce or avoid service degradation or more serious infrastructure failures, and the like.

Although isolating online store data can be important to maintaining data privacy between online stores 138 and merchants, there may be reasons for collecting and using cross-store data, such as for example, with an order risk assessment system or a platform payment facility, both of which require information from multiple online stores 138 to perform well. In some embodiments, it may be preferable to move these components out of the commerce management engine 136 and into their own infrastructure within the e-commerce platform 100.

Platform payment facility 120 is an example of a component that utilizes data from the commerce management engine 136 but is implemented as a separate component or service. The platform payment facility 120 may allow customers interacting with online stores 138 to have their payment information stored safely by the commerce management engine 136 such that they only have to enter it once. When a customer visits a different online store 138, even if they have never been there before, the platform payment facility 120 may recall their information to enable a more rapid and/or potentially less-error prone (e.g., through avoidance of possible mis-keying of their information if they needed to instead re-enter it) checkout. This may provide a cross-platform network effect, where the e-commerce platform 100 becomes more useful to its merchants and buyers as more merchants and buyers join, such as because there are more customers who checkout more often because of the ease of use with respect to customer purchases. To maximize the effect of this network, payment information for a given customer may be retrievable and made available globally across multiple online stores 138.

For functions that are not included within the commerce management engine 136, applications 142A-B provide a way to add features to the e-commerce platform 100 or individual online stores 138. For example, applications 142A-B may be able to access and modify data on a merchant's online store 138, perform tasks through the administrator 114, implement new flows for a merchant through a user interface (e.g., that is surfaced through extensions/API), and the like. Merchants may be enabled to discover and install applications 142A-B through application search, recommendations, and support 128. In some embodiments, the commerce management engine 136, applications 142A-B, and the administrator 114 may be developed to work together. For instance, application extension points may be built inside the commerce management engine 136, accessed by applications 142A and 142B through the interfaces 140B and 140A to deliver additional functionality, and surfaced to the merchant in the user interface of the administrator 114.

In some embodiments, applications 142A-B may deliver functionality to a merchant through the interface 140A-B, such as where an application 142A-B is able to surface transaction data to a merchant (e.g., App: "Engine, surface my app data in the Mobile App or administrator 114"), and/or where the commerce management engine 136 is able to ask the application to perform work on demand (Engine: "App, give me a local tax calculation for this checkout").

Applications 142A-B may be connected to the commerce management engine 136 through an interface 140A-B (e.g., through REST (REpresentational State Transfer) and/or GraphQL APIs) to expose the functionality and/or data available through and within the commerce management engine 136 to the functionality of applications. For instance, the e-commerce platform 100 may provide API interfaces 140A-B to applications 142A-B which may connect to products and services external to the platform 100. The flexibility offered through use of applications and APIs (e.g., as offered for application development) enable the e-commerce platform 100 to better accommodate new and unique needs of merchants or to address specific use cases without requiring constant change to the commerce management engine 136. For instance, shipping services 122 may be integrated with the commerce management engine 136 through a shipping or carrier service API, thus enabling the e-commerce platform 100 to provide shipping service functionality without directly impacting code running in the commerce management engine 136.

Depending on the implementation, applications 142A-B may utilize APIs to pull data on demand (e.g., customer creation events, product change events, or order cancelation events, etc.) or have the data pushed when updates occur. A subscription model may be used to provide applications 142A-B with events as they occur or to provide updates with respect to a changed state of the commerce management engine 136. In some embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In some embodiments, update events may be queued and processed asynchronously from a state change that triggered them, which may produce an update event notification that is not distributed in real-time or near-real time.

In some embodiments, the e-commerce platform 100 may provide one or more of application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, and the like. In some embodiments, applications 142A-B may be assigned an application identifier (ID), such as for linking to an application (e.g., through an API), searching for an application, making application recommendations, and the like.

Applications 142A-B may be grouped roughly into three categories: customer-facing applications, merchant-facing applications, integration applications, and the like. Customer-facing applications 142A-B may include an online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways 106.

As such, the e-commerce platform 100 can be configured to provide an online shopping experience through a flexible system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products through a number of different channels 110A-B such as, for example, the merchant's online store 138, a physical storefront through a POS device 152; an electronic marketplace, through an electronic buy button integrated into a website or a social media channel). In some cases, channels 110A-B may be modeled as applications 142A-B. A merchandising component in the commerce management engine 136 may be configured for creating, and managing product listings (using product data objects or models for example) to allow merchants to describe what they want to sell and where they sell it. The association between a product listing and a channel may be modeled as a product publication and accessed by channel applications, such as via a product listing API. A product may have many attributes and/or characteristics, like size and color, and many variants that expand the available options into specific combinations of all the attributes, like a variant that is size extra-small and green, or a variant that is size large and blue. Products may have at least one variant (e.g., a "default variant") created for a product without any options. To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Product listings may include 2D images, 3D images or models, which may be viewed through a virtual or augmented reality interface, and the like.

In some embodiments, a shopping cart object is used to store or keep track of the products that the customer intends to buy. The shopping cart object may be channel specific and can be composed of multiple cart line items, where each cart line item tracks the quantity for a particular product variant. Since adding a product to a cart does not imply any commitment from the customer or the merchant, and the expected lifespan of a cart may be in the order of minutes (not days), cart objects/data representing a cart may be persisted to an ephemeral data store.

The customer then proceeds to checkout. A checkout object or page generated by the commerce management engine 136 may be configured to receive customer information to complete the order such as the customer's contact information, billing information and/or shipping details. If the customer inputs their contact information but does not proceed to payment, the e-commerce platform 100 may (e.g., via an abandoned checkout component) to transmit a message to the customer device 150 to encourage the customer to complete the checkout. For those reasons, checkout objects can have much longer lifespans than cart objects (hours or even days) and may therefore be persisted. Customers then pay for the content of their cart resulting in the creation of an order for the merchant. In some embodiments, the commerce management engine 136 may be configured to communicate with various payment gateways and services 106 (e.g., online payment systems, mobile payment systems, digital wallets, credit card gateways) via a payment processing component. The actual interactions with the payment gateways 106 may be provided through a card server environment. At the end of the checkout process, an order is created. An order is a contract of sale between the merchant and the customer where the merchant agrees to provide the goods and services listed on the order (e.g., order line items, shipping line items, and the like) and the customer agrees to provide payment (including taxes). Once an order is created, an order confirmation notification may be sent to the customer and an order placed notification sent to the merchant via a notification component. Inventory may be reserved when a payment processing job starts to avoid over-selling (e.g., merchants may control this behavior using an inventory policy or configuration for each variant). Inventory reservation may have a short time span (minutes) and may need to be fast and scalable to support flash sales or "drops", which are events during which a discount, promotion or limited inventory of a product may be offered for sale for buyers in a particular location and/or for a particular (usually short) time. The reservation is released if the payment fails. When the payment succeeds, and an order is created, the reservation is converted into a permanent (long-term) inventory commitment allocated to a specific location. An inventory component of the commerce management engine 136 may record where variants are stocked, and may track quantities for variants that have inventory tracking enabled. It may decouple product variants (a customer-facing concept representing the template of a product listing) from inventory items (a merchant-facing concept that represents an item whose quantity and location is managed). An inventory level component may keep track of quantities that are available for sale, committed to an order or incoming from an inventory transfer component (e.g., from a vendor).

The merchant may then review and fulfill (or cancel) the order. A review component of the commerce management engine 136 may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to obtain or capture the payment information (e.g., credit card information) or wait to receive it (e.g., via a bank transfer, check, and the like) before it marks the order as paid. The merchant may now prepare the products for delivery. In some embodiments, this business process may be implemented by a fulfillment component of the commerce management engine 136. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. Alternatively, an API fulfillment service may trigger a third-party application or service to create a fulfillment record for a third-party fulfillment service. Other possibilities exist for fulfilling an order. If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In some embodiments, the e-commerce platform 100 may enable merchants to keep track of changes to the contract of sales over time, such as implemented through a sales model component (e.g., an append-only date-based ledger that records sale-related events that happened to an item).

Implementation in an e-Commerce Platform

Figure 16:
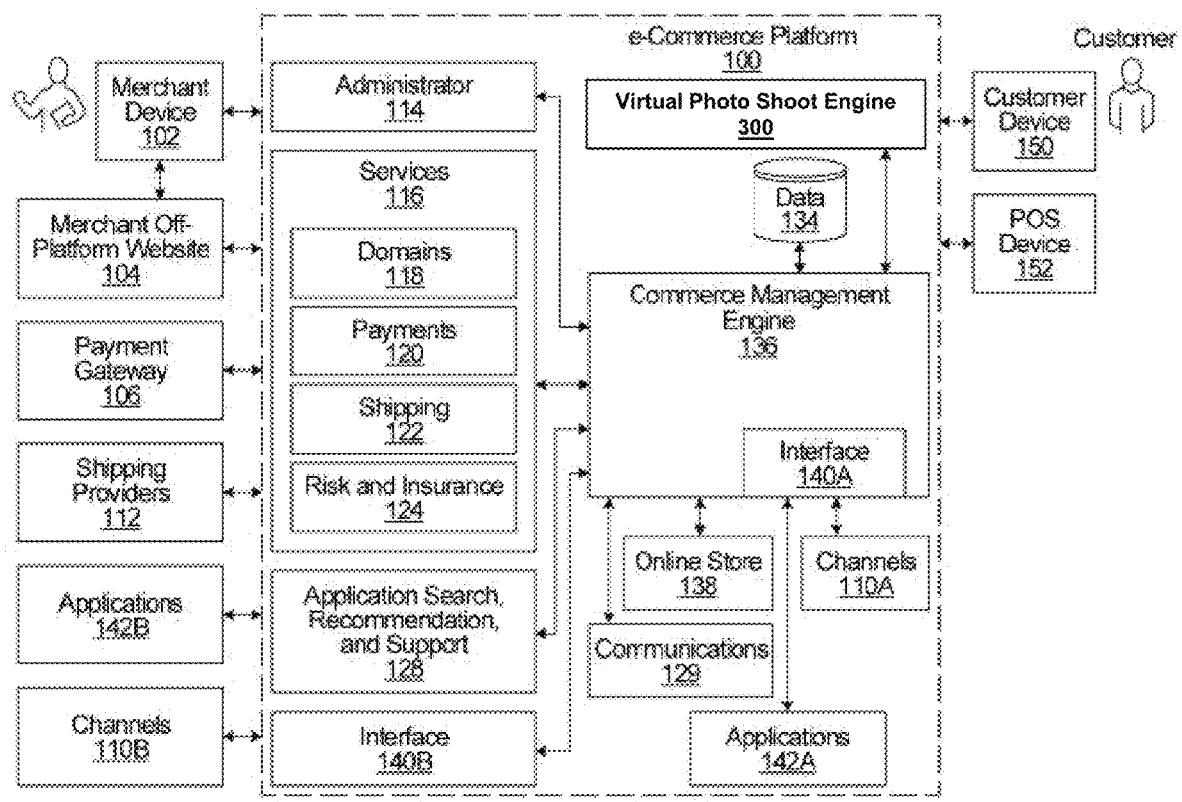
FIG. 16 is a block diagram illustrating an example of the e-commerce platform of FIG. 14 with an integrated tandem manipulation engine.

The functionality described herein may be used in commerce to provide improved customer or buyer experiences. The e-commerce platform 100 could implement the functionality for any of a variety of different applications, examples of which are described elsewhere herein. FIG. 16 illustrates the e-commerce platform 100 of FIG. 10 but including a virtual photo shoot engine 300. The engine 300 is an example of a computer-implemented system that implements the functionality described herein for use by the e-commerce platform 100, the customer device 150 and/or the merchant device 102.

Although the engine 300 is illustrated as a distinct component of the e-commerce platform 100 in FIG. 16, this is only an example. An engine could also or instead be provided by another component residing within or external to the e-commerce platform 100. In some embodiments, either or both of the applications 142A-B provide an engine that implements the functionality described herein to make it available to customers and/or to merchants. Furthermore, in some embodiments, the commerce management engine 136 provides that engine. However, the location of the engine 300 is implementation specific. In some implementations, the engine 300 is provided at least in part by an e-commerce platform, either as a core function of the e-commerce platform or as an application or service supported by or communicating with the e-commerce platform. Alternatively, the engine 300 may be implemented as a stand-alone service to clients such as a customer device 150 or a merchant device 102. In addition, at least a portion of such an engine could be implemented in the merchant device 102 and/or in the customer device 150. For example, the customer device 150 could store and run an engine locally as a software application. The e-commerce platform 100 can therefore be considered an example of a computing environment 10 in which the virtual photoshoot application 12 is implemented as an engine 300, coupled to the commerce management engine 136 and/or interface 140B to enable the virtual photo shoot functionality to be integrated into a UI displayed to the merchant device 102, the customer device 150, or both.

As discussed in further detail below, the engine 300 could implement at least some of the functionality described herein. Although the embodiments described below may be implemented in association with an e-commerce platform, such as (but not limited to) the e-commerce platform 100, the embodiments described below are not limited to e-commerce platforms.

Example e-Commerce User Interfaces

Figure 17:
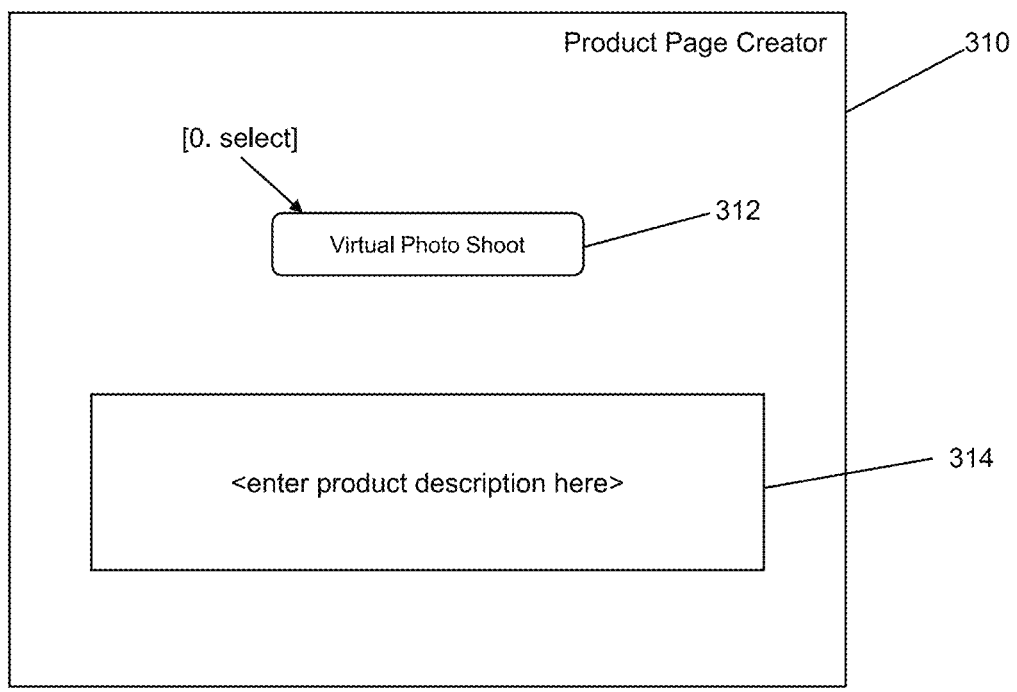
FIG. 17 shows an example of a user interface for creating a product page for an e-commerce application.
Figure 18:
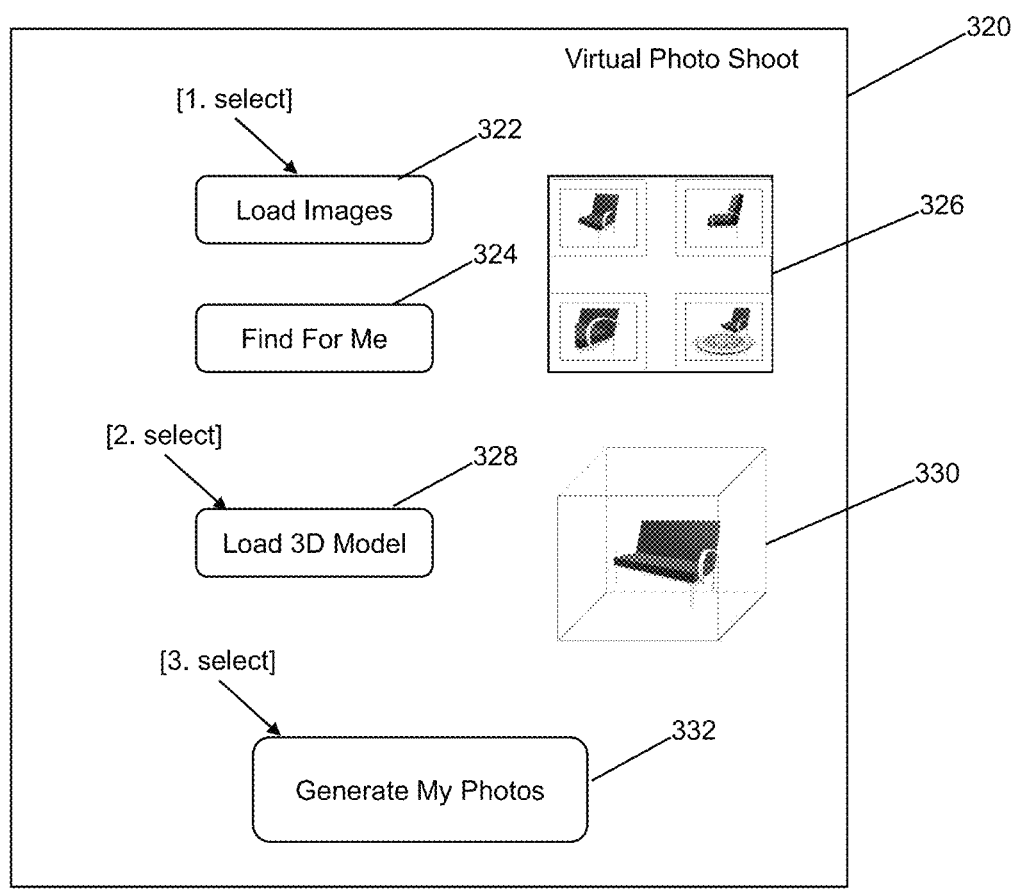
FIG. 18 shows an example of a virtual photo shoot application that can be accessed from the product page shown in FIG. 17 in an example implementation.

Referring now to FIG. 17, an example of a UI 310 that is particularly suitable to an e-commerce or other web- or app-based product page creator is shown. The UI 310 in this example includes a virtual photo shoot option 312 that can be used to launch the virtual photo shoot application 12. The UI 310 also includes a product description entry box 314 that can be used to input a text-based description of the product. At step 0 the virtual photo shoot option 312 is selected, which in this example launches a UI 320 for the virtual photo shoot application 12. The virtual photo shoot UI 320 includes a Load Images option 322 and a Find for Me option 324. An image viewer pane 326 is also provided, which displays the loaded images. In this example, step 1 includes selecting the Load Images option 322, which enables the user to load the input set of 2D images 36 used to determine the viewpoint to apply to another object. The images shown in FIGS. 8a-8d are illustrated in FIG. 18. It can be appreciated that while multiple different view angles and/or zoom levels are illustrated herein, an option can also be provided to select one or more of the multiple views to be applied in an output such as that shown in FIG. 17. That is, while the image processing module 22 can be configured to generated multiple views/viewpoints for the first and/or second objects, not all views need to be utilized and the user can be provided with control over the same. The virtual photo shoot application 12 can also automatically generate a predefined set of standard views and have the user select, either before or after initiating the process described herein, to have a desirable set of one or more 2D images generated in the virtual photo shoot.

Figure 19:
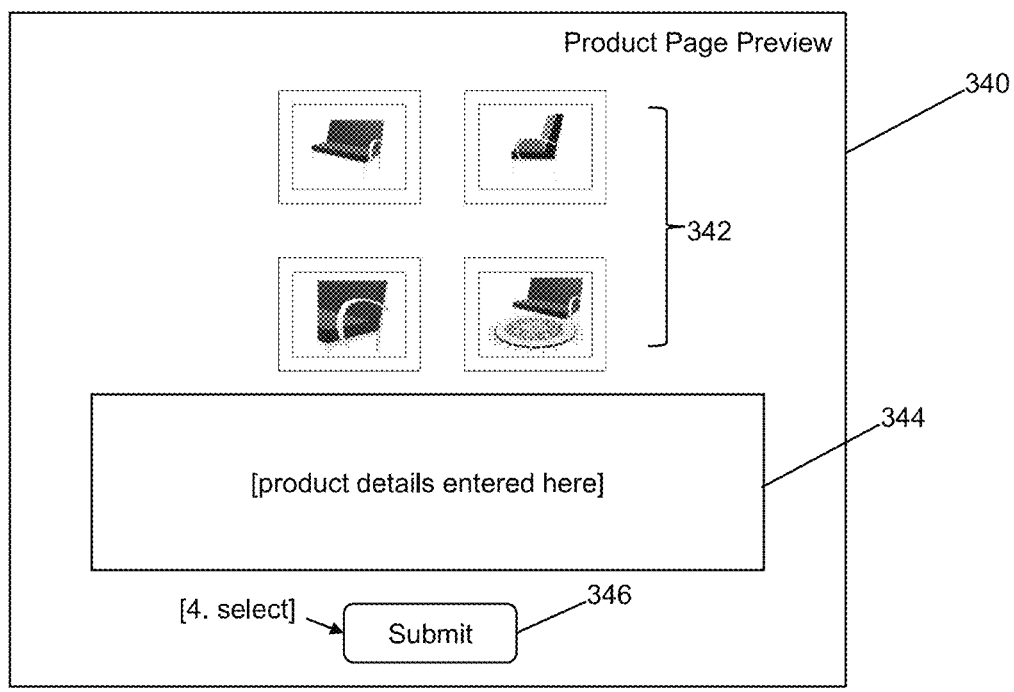
FIG. 19 shows an example of a user interface for previewing a product page with a set of images generated using the virtual photo shoot application shown in FIG. 18 in an example implementation.

The virtual photo shoot UI 320 also includes a Load 3D Model option 328 which is selected at step 2 to enable the user to load the 3D model associated with the object (e.g., the second object or Object B above) for which the virtual photo shoot is to be applied. A model viewer pane 330 is also shown in FIG. 18, which corresponds to the 3D model shown in FIG. 9 by way of example. A Generate My Photos option 332 is also provided in the UI 320, which can be selected at step 3 to generate a product page preview UI 340 as shown in FIG. 19. In this example, a set of 2D images 342 (similar to those shown in FIGS. 10a-10d) is shown in this example to illustrate an application of the virtual photo shoot application 12, namely to generate an output set of 2D images 44 that can be inserted into the product page preview UI 340. Also shown are a completed product details pane 344 and a Submit option 346. At step 4, the user may select the Submit option 346 to have the product page posted to the e-commerce site, e.g., using the e-commerce platform 100 described above.

For simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

It will also be appreciated that any module or component exemplified herein that executes instructions may include or otherwise have access to computer readable media such as transitory or non-transitory storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory computer readable medium which can be used to store the desired information and which can be accessed by an application, module, or both. Any such computer storage media may be part of the computing environment 10 or e-commerce platform 100, any component of or related thereto, etc., or accessible or connectable thereto. Any application or module herein described may be implemented using computer readable/executable instructions that may be stored or otherwise held by such computer readable media.

The steps or operations in the flow charts and diagrams described herein are provided by way of example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as having regard to the appended claims in view of the specification as a whole.

The invention claimed is:

1. A computer-implemented method, comprising:
   determining, from one or more 2D images of a first object arranged in a particular manner, one or more parameters of a viewpoint capable of replicating how the first object as arranged in the particular manner results in a view of the first object that corresponds to what is seen in the one or more 2D images;
   arranging a second object in the particular manner by rendering a virtual 3D model of the second object according to the view defined by the viewpoint by positioning the virtual 3D model of the second object according to the one or more parameters determined from the one or more 2D images of the first object, wherein the first object is different from the second object; and
   generating a set of one or more 2D images of the second object from the rendered virtual 3D model of the second object.

2. The method of claim 1, wherein the viewpoint comprises at least one orientation of the virtual 3D model.

3. The method of claim 2, comprising determining a plurality of views, each view corresponding to a respective viewpoint of the virtual 3D model.

4. The method of claim 1, wherein the viewpoint comprises a zoom level.

5. The method of claim 1, wherein the viewpoint comprises an image depth.

6. The method of claim 1, further comprising:
   obtaining the set of one or more 2D images of the first object; and
   processing the set of one or more 2D images to determine the viewpoint.

7. The method of claim 1, further comprising:
   obtaining a virtual 3D model of the first object capable of generating the one or more 2D images of the first object arranged in the particular manner; and
   determining the viewpoint from the virtual 3D model of the first object.

8. The method of claim 7, wherein the virtual 3D model of the first object is:
   successively manipulated to approximate what is shown in the one or more 2D images of the first object, and
   compared to the one or more 2D images of the first object until a similarity criterion has been met.

9. The method of claim 1, wherein the viewpoint is determined from a collection of 2D images of objects similar to the first object.

10. The method of claim 1, further comprising:
    determining one or more lighting parameters; and
    applying the one or more lighting parameters to a virtual scene comprising the virtual 3D model.

11. The method of claim 1, further comprising:
    applying the method to a plurality of first objects and to a plurality of second objects; and
    generating a composite virtual scene comprising the plurality of second objects prior to capturing the set of 2D images of the plurality of second objects.

12. The method of claim 11, wherein generating the composite virtual scene comprises applying at least one offset factor to arrange the plurality of second objects relative to each other.

13. The method of claim 1, further comprising:
rendering a virtual 3D model of at least one additional object; and
capturing a set of one or more 2D images of the virtual 3D model of the at least one additional object arranged according to the viewpoint.

14. The method of claim 1, further comprising:
providing an option for a virtual photoshoot of the second object; and
receiving an input providing the set of one or more 2D images of the first object or requesting the set of one or more 2D images to be automatically determined.

15. The method of claim 1, wherein the set of one or more 2D images of the first object corresponds to one or more real-world images taken of the first object.

16. The method of claim 1, wherein the first object and the second object are the same product, and wherein the set of one or more 2D images of the first object corresponds to one or more real-world images taken of the product.

17. A system comprising:
at least one processor; and
at least one memory, the at least one memory comprising computer executable instructions that, when executed by the at least one processor, cause the system to:
determine, from one or more 2D images of a first object arranged in a particular manner, one or more parameters of a viewpoint capable of replicating how the first object as arranged in the particular manner results in a view of the first object that corresponds to what is seen in the one or more 2D images;
arrange a second object in the particular manner by rendering a virtual 3D model of the second object according to the view defined by the viewpoint by positioning the virtual 3D model of the second object according to the one or more parameters determined from the one or more 2D images of the first object, wherein the first object is different from the second object; and
generate a set of one or more 2D images of the second object from the rendered virtual 3D model of the second object.

18. The system of claim 17, wherein the viewpoint comprises at least one orientation of the virtual 3D model.

19. The system of claim 17, wherein the viewpoint comprises a zoom level.

20. The system of claim 17, wherein the viewpoint comprises an image depth.

21. The system of claim 17, further comprising instructions that, when executed by the at least one processor, cause the system to:
obtain the set of one or more 2D images of the first object; and
process the set of one or more 2D images to determine the viewpoint.

22. The system of claim 17, further comprising instructions that, when executed by the at least one processor, cause the system to:
obtain a virtual 3D model of the first object capable of generating the one or more 2D images of the first object arranged in the particular manner; and
determine the viewpoint from the virtual 3D model of the first object.

23. The system of claim 17, further comprising instructions that, when executed by the at least one processor, cause the system to:
obtain the set of one or more 2D images of the first object; and
process the set of one or more 2D images to determine the viewpoint.

24. The system of claim 23, wherein the virtual 3D model of the first object is:
successively manipulated to approximate what is shown in the one or more 2D images of the first object, and
compared to the one or more 2D images of the first object until a similarity criterion has been met.

25. A computer readable medium comprising computer executable instructions that when executed by a processor, cause the processor to execute instructions comprising:
determining, from one or more 2D images of a first object arranged in a particular manner, one or more parameters of a viewpoint capable of replicating how the first object as arranged in the particular manner results in a view of the first object that corresponds to what is seen in the one or more 2D images;
arranging a second object in the particular manner by rendering a virtual 3D model of the second object according to the view defined by the viewpoint by positioning the virtual 3D model of the second object according to the one or more parameters determined from the one or more 2D images of the first object, wherein the first object is different from the second object; and
generating a set of one or more 2D images of the second object from the rendered virtual 3D model of the second object.

* * * * *